(12) United States Patent
Negishi

(10) Patent No.: US 7,591,171 B2
(45) Date of Patent: Sep. 22, 2009

(54) ATOMIC FORCE MICROSCOPE

(75) Inventor: Mahito Negishi, Tachikawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 52 days.

(21) Appl. No.: 11/675,562

(22) Filed: Feb. 15, 2007

(65) Prior Publication Data

US 2007/0195333 A1 Aug. 23, 2007

(30) Foreign Application Priority Data

Feb. 16, 2006 (JP) .............................. 2006-038779

(51) Int. Cl.
*G01B 5/28* (2006.01)
*G01N 13/16* (2006.01)
*G12B 21/22* (2006.01)

(52) U.S. Cl. ....................................... 73/105

(58) Field of Classification Search ................ 73/105
See application file for complete search history.

(56) References Cited

U.S. PATENT DOCUMENTS

| | | | |
|---|---|---|---|
| 5,298,975 A * | 3/1994 | Khoury et al. ............... 356/624 |
| 5,408,094 A | 4/1995 | Kajimura .................... 250/234 |
| 5,560,244 A | 10/1996 | Prater et al. .................. 73/105 |
| 5,616,916 A * | 4/1997 | Handa et al. ................. 250/234 |
| 5,763,767 A * | 6/1998 | Jung et al. ..................... 73/105 |
| 5,825,020 A * | 10/1998 | Hansma et al. .............. 250/216 |
| 5,861,550 A * | 1/1999 | Ray ............................. 73/105 |
| 5,949,070 A * | 9/1999 | Gamble ....................... 250/306 |
| 5,986,262 A * | 11/1999 | Volcker ....................... 250/306 |
| 6,127,681 A * | 10/2000 | Sato et al. .................... 250/306 |
| 6,189,373 B1 * | 2/2001 | Ray ............................. 73/105 |
| 7,022,985 B2 * | 4/2006 | Knebel et al. ............... 250/306 |
| 7,249,494 B2 * | 7/2007 | Hwang et al. ................. 73/105 |

FOREIGN PATENT DOCUMENTS

JP 5-312561 11/1993

* cited by examiner

*Primary Examiner*—Daniel S Larkin
(74) *Attorney, Agent, or Firm*—Fitzpatrick, Cella Harper & Scinto

(57) ABSTRACT

A surface shape of a member to be measured is measured by reflecting measuring light at a reflection surface of a probe and utilizing an atomic force exerting between the probe and utilizing an atomic force exerting between the probe and the member to be measured. In addition to a first scanner for driving the probe, a second scanner for moving a focus position of an optical system is provided. Position conversion data representing a correlation between amounts of control of the first scanner and the second scanner are obtained in advance. By synchronously driving the first scanner and the second scanner, the focus position of the optical system is caused to follow the probe to improve measurement accuracy.

10 Claims, 22 Drawing Sheets

(a)

(b)

ATOMIC FORCE MICROSCOPE

FIELD OF THE INVENTION AND RELATED ART

The present invention relates to an atomic force microscope capable of measuring a minute shape on the order of subnanometers by using an optical lever for detecting displacement of a probe.

A probe used in an atomic force microscope includes a flat spring portion having an end provided with a sharp pointed portion. On the flat spring portion, a reflection surface is formed. The probe is also called "cantilever" but is herein inclusively described as "probe".

FIG. 26 shows a constitution of a conventional atomic force microscope described in U.S. Pat. No. 5,560,244. The atomic force microscope effects measurement of a member 113 to be measured. A probe 114 is attached to a mount 120, and the mount 120 is attached to a lower end of a tube scanner 112 movable in X, Y and Z directions. A beam from a light source 110 is once focused by a lens 160 to form a point source 162 of light and is then focused onto a back surface of the probe 114 by a lens 163 fixed to the scanner 112. A position of reflected light is detected by a light detection means 116.

In this constitution, when the probe 114 is brought near to the member 113 (to be measured), the probe 114 is bent by a force exerted therebetween, i.e., atomic force. When the probe 114 is bent, a direction of the reflected light is changed, so that a signal of the light detection means 116 is changed. Accordingly, by detecting the position of the reflected light from the probe 114, atomic force exerted between the probe 114 and the member 113 can be measured. Such a technique that displacement at the position of the reflected light is read in an enlarged state has been widely known as an "optical lever" and employed also in the atomic force microscope.

Further, in the atomic force microscope described in U.S. Pat. No. 5,560,244, the probe 114 is subjected to scanning along a surface of the member 113 by the tube scanner 112. In this case, a position of the tube scanner 112 on the probe 114 side is moved by the scanning with a fixed position thereof on the light source 110 side. Accordingly, a position of the light source 110 is not moved but the lens 163 is moved together with the scanner 112, so that a focus position of the focused light is changed. In other words, by using an optical system such as a lens or the like fixed to the scanner, it is possible to always focus light for optical lever onto the back surface of the probe while permitting the following of movement of the scanner by the light.

FIG. 27 shows a constitution of another conventional atomic force microscope described in Japanese Laid-Open Patent Application (JP-A) No. Hei 5-312561. The atomic force microscope effects measurement of a member 203 to be measured. A probe 209 is provided at an end of a tube scanner 204. At the end of the tube scanner 204, a light source LD is also fixedly provided. Light emitted from the light source LD is focused onto a back surface of the probe 209. Reflected light from the back surface of the probe 209 is caused to enter the light detection means 211 through fixed lenses L1 and L2 to detect a position of the reflected light. In this embodiment, the position of the reflected light incident into the light detection means 211 is enlarged by an optical system including the lenses L1 and L2.

In this constitution, similarly as in U.S. Pat. No. 5,560,244, a so-called "optical lever" principle such that bending of the probe 209 is converted into a direction of reflected light. The probe 209 is moved along a surface of the member 203 by the scanner 204 but the light source LD attached to the end of the scanner 204 is moved together with the probe 209. For this reason, the light is always focused onto the back surface of the probe 209. In other words, by disposing the light source at the end of the scanner, the atomic force microscope is constituted so that the light for optical lever follows movement of the scanner and is always incident onto the back surface of the probe.

Two modes have been known as a measurement mode of the atomic force microscope. One mode is called "DC mode" in which bending of the probe is changed by a force exerting between the member to be measured and the probe and is thus detected. Another mode is called "AC mode" in which the probe is subjected to steady-state vibration at a high frequency and a resultant vibration state of the probe is changed by a force exerted between the member to be measured and the probe, thus being detected. In either mode, accuracy of movement varies depending on whether or not bending (displacement) of the probe can be measured with accuracy.

Further, in the conventional atomic force microscopes, a technique, for improving the measurement accuracy, which is called "null-balance method" has been used. In this method, instead of measuring a change in position of reflected light from a probe by a light detection means, the probe is moved so as not to change the position of reflected light. A movable axis (shaft) capable of controlling a distance between the probe and a member to be measured is provided and controlled so that bending of the probe caused by interaction of the probe with the member is kept at a constant level, and an amount of movement of the movable axis is taken as a measured value. By employing such a constitution, even when the interaction between the probe and the member has a non-linear characteristic with respect to a relative distance between the probe and the member, it is possible to eliminate an influence of the non-linear characteristic.

However, the above described conventional atomic force microscopes have been accompanied with the following problems.

(1) Patent deviation between a probe and focus of an optical system is caused to occur during scanning.

In an atomic force microscope utilizing "optical lever", a shape of a member to be measured is measured by a position of reflected light from the probe. For this reason, it is impossible to effect high-accuracy measurement unless the focus of "optical lever" is accurately formed on the probe.

However, in U.S. Pat. No. 5,560,244 and JP-A Hei 5-312561, the tube scanner is used, so that the end of the tube scanner is moved arcuately with a fixed position as a center when the probe is subjected to scanning. For this reason, an attitude of each of lenses constituting the optical system attached to the scanner is also changed largely. As a result, a focus position of the optical system is deviated from a reflection surface of the probe, so that measurement accuracy is reduced.

Further, in the atomic force microscope, the position of the probe is changed in an optical axis direction during the measurement. In U.S. Pat. No. 5,560,244 and JP-A Hei 5-312561, when an amount of the change in that case is equal to or less than depth of focus, it is possible to measure the position of the probe with high accuracy.

The depth of focus is ordinarily approximately 30 μm in the case of employing an optical device having NA=0.1, so that it is possible to measure high-accuracy measurement in the case where the member to be measured has an unevenness of 10 μm or below. However, in the case of an uneven shape having an unevenness of several tens of microns or above, reflected light is diffused. As a result, it is difficult to effect measurement at high accuracy.

Further, light from a fixed light source passes through different portions of each of lenses constituting an optical system by an operation of a scanner. However, an actual lens varies in characteristic such as refractive index depending on a portion of the lens, so that a focus position is deviated from a designed value when a portion through which light passes is changed. More specifically, during the operation of the scanner, the light-passing portion of each of the lenses constituting the optical system is changed, so that position deviation of focus of the optical system is caused to occur. As a result, the focus position and a probe position are deviated from each other.

(2) It is difficult to detect a focus position.

As described above, in the atomic force microscope utilizing the "optical lever", it is important that a position of the probe is set to a focus position of the optical system. In order to realize this setting, it is necessary to accurately measure the probe position and the optical system focus position. However, in U.S. Pat. No. 5,560,244 and JP-A Hei 5-312561, these positions cannot be measured. It is also possible to consider that both of the focus position and the probe position are externally observed by an optical microscope and aligned with each other. However, this is very complicated, thus being less practical.

(3) It is difficult to adjust a focus position with lapse of time.

In order to effect high-accuracy measurement, focus is required to be always formed accurately on the probe as a target of the "optical lever". As described above, the position of the probe as the target of the "optical lever" is moved by the operation of the scanner, so that it is necessary to cause the focus position of the "optical lever" to follow the probe position in accordance with a motion of the scanning. In U.S. Pat. No. 5,560,244 and JP-A Hei 5-312561, this problem has been solved by attaching a lens to the scanner or attaching a light source to the scanner.

However, an apparatus such as the scanner causes a change with lapse of time due to deterioration of parts etc., so that an amount of the change is not negligible. In order to meet the motion change of the scanner in view of the change with time, it is necessary to adjust a position and attitude of the lens or the light source attached to the end of the scanner. In U.S. Pat. No. 5,560,244 and JP-A Hei 5-312561, the light source and the probe are fixed to the scanner having the optical system, so that it is not easy to effect the adjustment. It is possible to adjust positions of these elements (members) which have been originally fixed and then fix the elements again. However, this adjustment is very complicated, so that complicated adjustment performed frequently is a large problem from a practical viewpoint.

(4) Alignment adjustment during replacement of a probe is complicated.

An end of the probe is deteriorated due to wearing or the like, so that the probe is a consumable part. When the probe is replaced, a position of the probe is always deviated due to a production error or a mounting error. For this reason, the optical system is required to be readjusted so that the focus is always formed accurately on the probe as the target of the "optical lever". However, in U.S. Pat. No. 5,560,244 and JP-A Hei 5-312561, it is difficult to detect the focus position and adjustment of the focus position is complicated, so that alignment adjustment during replacement of the probe is also complicated. From a practical viewpoint, complicated adjustment performed frequently is large deficiency.

(5) It is difficult to meet a multi-probe.

In a conventional technique, it is difficult to develop multi-probing capable of simultaneously measure many points using a large number of probes close to each other with a spacing of, e.g., about 100 µm. When a number of "optical lever" optical systems in accordance with JP-A Hei 5-312561 are disclosed, many light sources lenses, and light detection means are to be disposed close to each other. However, it is impossible to dispose all these constitutional elements (members) close to each other. This is because each of the constitutional elements is larger in size than 100 µm. Particularly, the lenses require some aperture ratio for focusing light, so that it is difficult to reduce the size of the lenses. Further, also in U.S. Pat. No. 5,560,244, a number of light sources and light detection means are similarly disposed close to each other, the light sources are provided to the end of the scanning, so that it is further difficult to reduce the size of the end of the scanning.

(6) It is difficult to effect high-accuracy measurement since the end of the scanner cannot be reduced in size.

In U.S. Pat. No. 5,560,244, a light source is provided at the end of the scanner, so that there is a possibility of heat generation at the scanner end. The atomic force microscope is ordinarily directed to measurement at high accuracy on the order of subnanometers, so that it is largely affected by a change in temperature. In the conventional atomic force microscope including a heat generation source disposed in the neighborhood of a point of measurement, the high-accuracy measurement cannot be expected. Further, it is necessary to attach the light source and an optical element for focusing light emitted from the light source onto the probe at the end of the scanner, so that a weight of the end of the scanner cannot be decreased. When the end of the scanner is heavy, an error during scanning is also large. Thus, the high-accuracy measurement cannot be also expected.

SUMMARY OF THE INVENTION

The present invention has accomplished in view of the above described problems.

A principal object of the present invention is to provide an atomic force microscope capable of measuring a shape at high accuracy by causing a focus position of an optical system to follow a position of a probe.

According to an aspect of the present invention, there is provided an atomic force microscope for measuring a surface shape of a member to be measured, comprising:

a light source for emitting measuring light;

a probe having a reflection surface;

an optical system for focusing the measuring light from the light source on the reflection surface of the probe;

a housing for holding the optical system;

a probe scanner, mounted to the housing, for holding the probe and moving the probe in X direction, Y direction, or Z direction relative to the housing;

light detection means for detecting the measuring light reflected by the reflection surface;

processing means for processing displacement of said probe in Z direction on the basis of an output of said light detection means;

focus position movement means for moving a focus position of said optical system by shifting an optical path of the measuring light before the measuring light enters the optical system; and control means for controlling drive of the probe scanner and the focus position movement means, wherein the control means drives the focus position movement means in synchronism with drive of the probe scanner so that a focus position of the measuring light focused by the optical system is on the reflection surface of the probe.

These and other objects, features and advantages of the present invention will become more apparent upon a consideration of the following description of the preferred embodiments of the present invention taken in conjunction with the accompanying drawings.

DESCRIPTION OF THE PREFERRED EMBODIMENTS

Embodiments of the present invention will be described with reference to the drawings.

Figure 1:
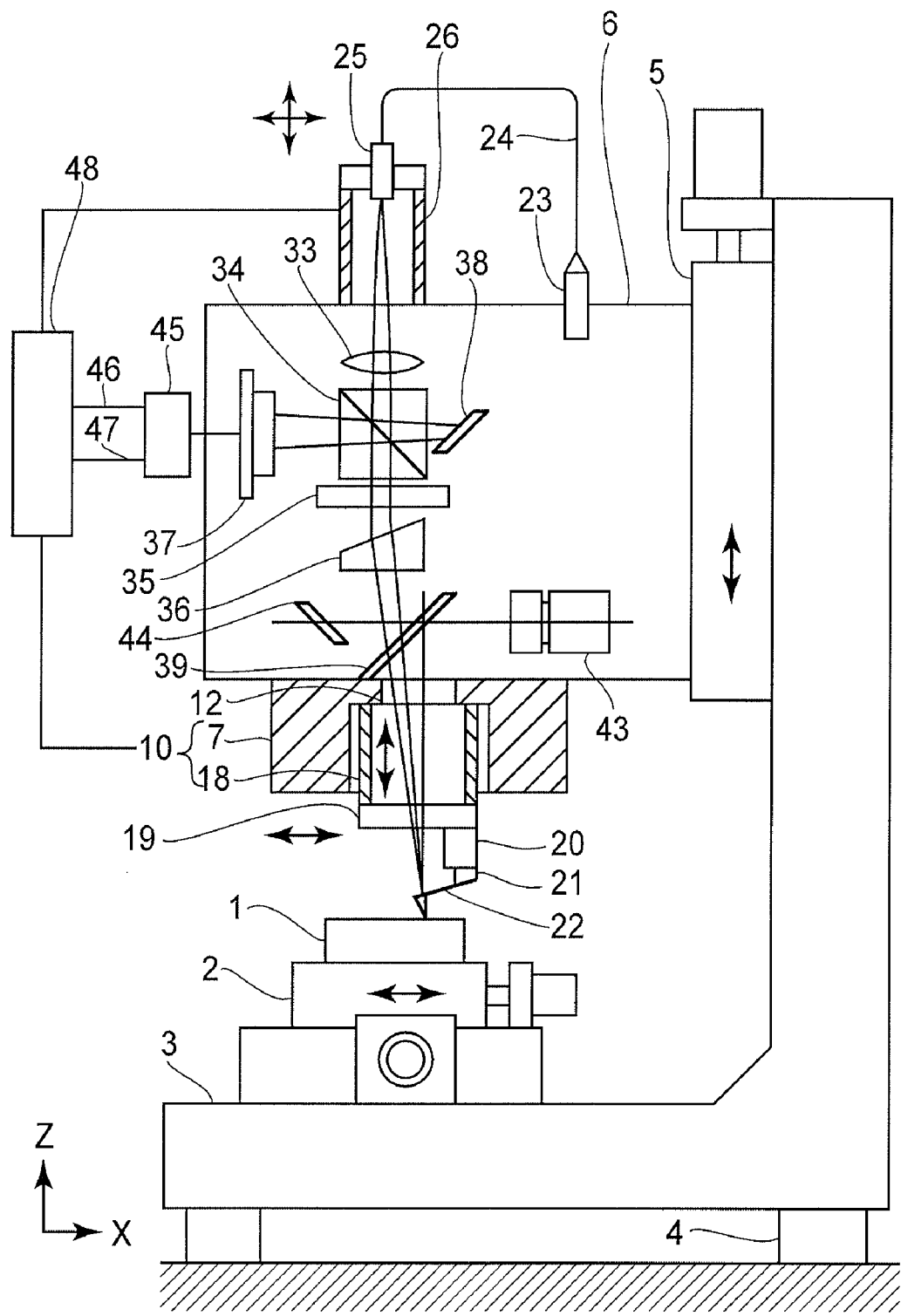
FIG. 1 is a schematic view for illustrating Embodiment 1.

As shown in FIG. 1, a member 1 to be measured is held on an XY coarse movement (adjustment) stage 2 and a first scanner 10 as a probe scanner is provided to a housing 6 fixed to a Z coarse movement stage 5. A position of a probe 22 having a reflection surface is finely moved in X, Y and Z directions by the first scanner 10 to bend the probe 22 by a force acting between the probe 22 and the member 1 to be measured, so that an amount of movement (displacement) of the reflection surface of the probe is measured.

An optical system for measurement is a focusing optical system for focusing measuring light from a light source 23 on the reflection surface of the probe 22 and includes a second scanner 26 as a focus position movement means for moving the focus position and a light detection means 37 for receiving (detecting) light reflected by the probe 22. In this embodiment, measurement values representing a surface shape of the member 1 to be measured are calculated by using output signals, i.e., a light position signal and light amount signal of the reflected light, by the light detection means utilizing "optical lever" and X, Y and Z positions of the first scanner 10.

The first scanner 10 and the second scanner 26 are synchronously controlled by a scanner control apparatus (control means) 48. In an atomic force microscope utilizing "optical lever", it is important that the focus position is kept on the reflection surface of the probe 22 in order to ensure measurement accuracy, so that the focus position is required to be moved together with the first scanner 10 since the probe 22 is moved by drying the first scanner 10.

Figure 2:
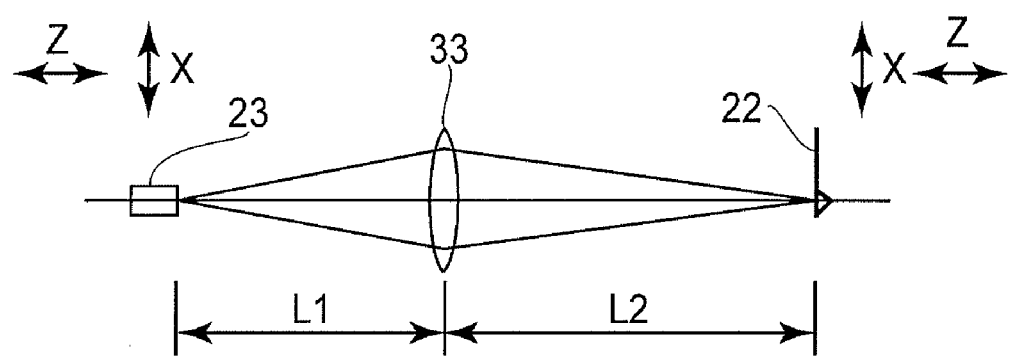
FIGS. 2(a) and 2(b) are schematic views for illustrating an action of a second scanner of an apparatus used in Embodiment 1.
Figure 2:
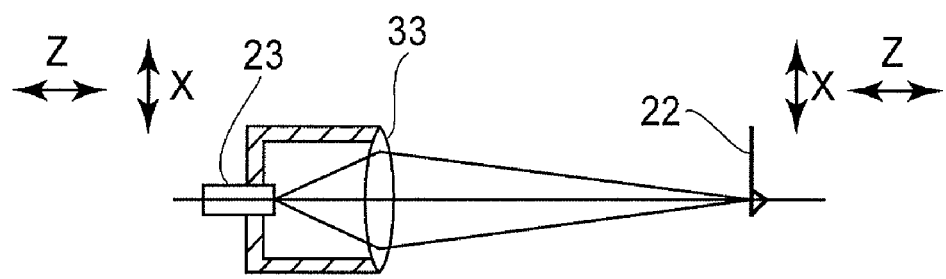

FIG. 2(a) is a schematic view showing an optical path from the light source 23 for "optical lever" to the probe 22 via the optical system including a lens 33. The measuring light from the light source 23 is required to be focused on the probe 22 but the probe 22 is moved in, e.g., X direction. In this case, the focus position is required to be always located on the probe 22, so that the focus position is moved by moving the light source 23 in X direction by the second scanner 26. In this manner, the first and second scanners 10 and 26 are moved synchronously, so that the focus is always formed on the probe 22. Incidentally, in the embodiment shown in FIG. 2(a), a similar effect is also achieved by moving the lens 33 in place of the light source 23. Further, depending on design convenience, it is also possible to deflect an optical axis by disposing a deflection mirror between the light source 23 and the probe 22. A similar effect is also achieved by using an optical system using a plurality of lenses in order to reduce lens aberration.

Further, as shown in FIG. 2(b), in place of the constitution shown in FIG. 2(a), it is also possible to employ such a constitution that a distance between the light source 23 and the lens 33 is fixed. In this case, when the probe 22 is moved in X direction by the first scanner 10, the light source 23 and the lens 33 are moved in X direction by the second scanner 26. As a result, the focus position is moved, so that it is possible to always form a focus on the probe 22.

Further, the second scanner 26 is also movable in Z direction as an optical axis direction in addition to the two (X and Y) directions perpendicular to the optical axis. In the constitution shown in FIG. 2(a), the probe 22 is moved in X, Y and Z directions by the first scanner 10. In this case, the focus position is required that it is always located on the probe 22, so that the light source 23 is moved in X, Y and Z directions by the second scanner 26. Here, a positional relationship between the light source 23 and the probe 22 via the lens 33 is a conjugation relationship and is configured to form the focus on a back scanner of the probe 22. Further, by synchronizing motions of the first scanner 10 and the second scanner 26 to keep amounts of movement of these scanners at a ratio of L1:L2, it is possible to always form the focus on the probe 22.

In the constitution shown in FIG. 2(b), the measuring light from the light source 23 is required to form the focus on the probe 22 but the probe 22 is moved in X, Y and Z directions. In this case, it is necessary to always form the focus on the probe 22, so that the light source 23 and the optical system 33 are moved in X, Y and Z directions by the second scanner 26. By synchronously moving the first scanner 10 and the second scanner 26, it is possible to always form the focus on the probe 22.

As described above, by providing the second scanner 26 movable in the optical axis direction in addition to two (X and Y) directions perpendicular to the optical axis, the focus position and the probe position are independently controllable three dimensionally.

Further, in this embodiment, the first and second scanners are controlled synchronously. More specifically, a focus position of the optical system and a following error for the probe 22 are obtained in advance so that a position of the probe 22 moved by the first scanner 10 is always the focus position of the optical system, thus preparing position conversion data. The position conversion data may be prepared by preparing an output map of the light detection means 37 by performing scanning with the second scanner 26 while fixing the first scanner 10 and repetitively performing a step of calculating a position of the reflection surface of the probe 22 from the output map in an entire measuring area by changing the position of the first scanner 10. It is also possible to employ such a method that a step of preparing a similar output map by performing scanning with the first scanner 10 while fixing the second scanner 26 is repetitively performed by changing the positive of the second scanner 26.

According to this embodiment, it is possible to control the focus position in correspondence with the probe position. Further, it is possible to meet various motions by such a simple method that the position conversion data is changed. For example, when the probe is replaced or when a correction is made with respect to a change with time caused by deterioration of parts or the like, position conversion data depending on a probe used may be prepared.

In this embodiment, by providing the second scanner 26 for moving the focus position separately from the first scanner 10 for moving the probe 22, it is possible to control the focus position independently and synchronously with respect to the probe position by the first scanner 10. As a result, it is possible to adjust the focus of the optical system in a three-dimensional manner, so that it is possible to meet deviation in the optical axis direction and improve measurement accuracy. Further, it is possible to measure even a member to be measured having an uneven shape with an unevenness of several tens of microns while causing the focus to follow the Z axis.

Further, when the following error between the focus position and the probe 22 is known in advance, it is possible to move the second scanner 26 so as to cancel the following error. As a result, it is possible to cause the focus position to follow the probe 22 with accuracy, so that high-accuracy measurement can be effected compared with a conventional method. In this case, it is necessary to know the following error in advance but a method therefor can be employed as described later. Further, in this embodiment, compared with the constitution in which the probe and the light source are provided to the same scanner, it is possible to reduce a size of the end of the scanner, thus resulting in reduction in size in addition to the high-accuracy measurement.

Further, also in this embodiment, similarly as in the cases of U.S. Pat. No. 5,560,244 and JP-A Hei 5-312561, the optical axis of "optical lever" is moved by scanning with the probe 22, so that a light beam passes through different portions of the lens 33.

However, according to this embodiment, it is possible to independently control the focus position and the probe position, so that it is possible to correct lens aberration. As a result, the focus position is not deviated.

Embodiment 1

FIG. 1 shows an atomic force microscope according to Embodiment 1. A base 3 is disposed on a vibration isolation stand 4 and on the base 3, an XY coarse movement stage 2 is disposed. On the XY coarse movement stage 2, a member 1 to be measured is set. To a Z coarse movement stage 5 provided vertically to the base 3, a housing 6 is provided. The housing 6 holds an XY scanner 7 movable in X and Y directions.

Figure 3:
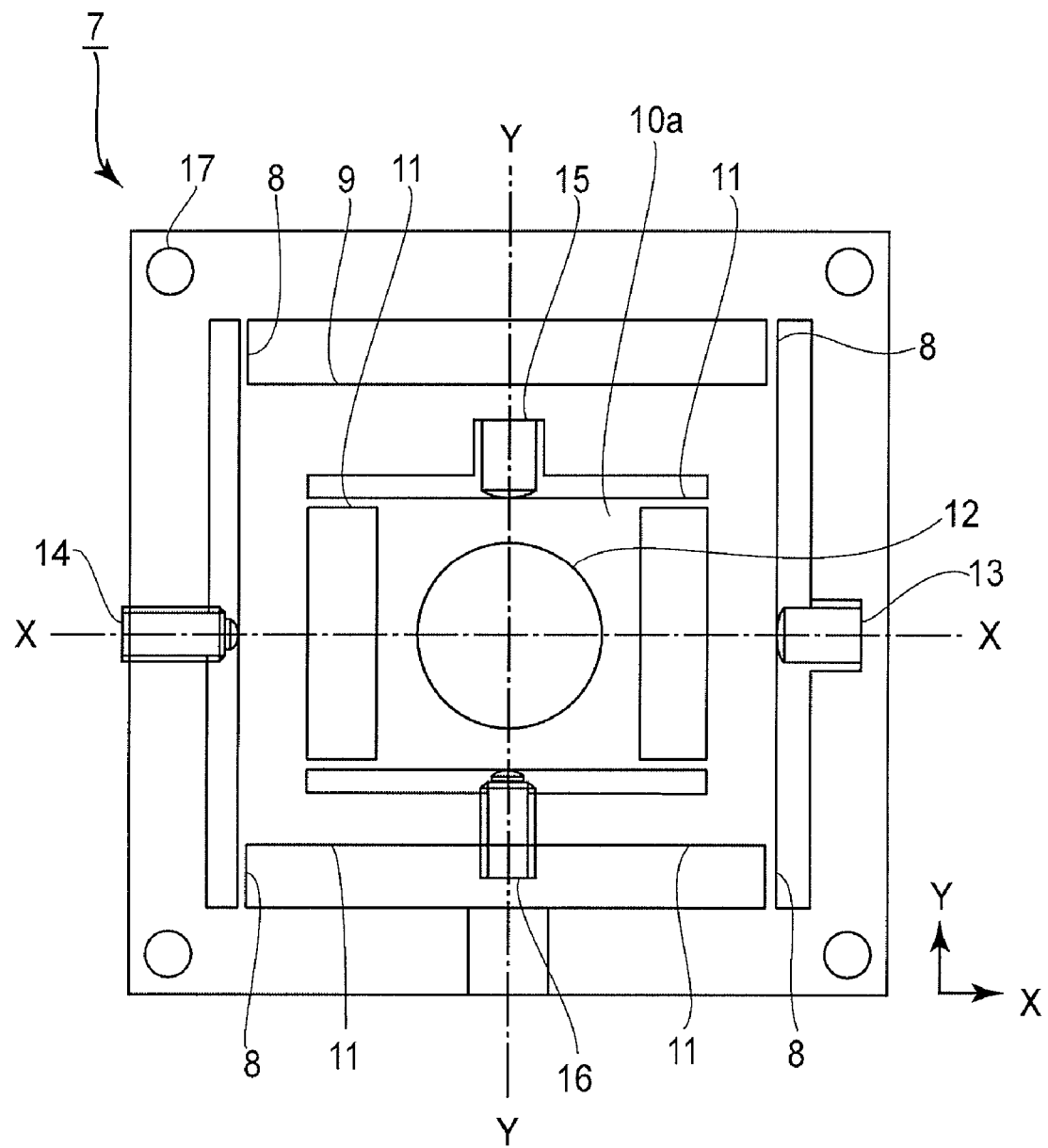
FIG. 3 is a plan view showing a constitution of a first scanner of the apparatus used in Embodiment 1.

FIG. 3 is a schematic view of the XY scanner 7 as seen from above (Z direction). A main assembly of the XY scanner 7 has a hinge mechanism cut from a metal material and is provided with four X plate spring portions 8 formed by wire cut processing, so that an X movement portion 9 is movably guided in X direction. In the X movement portion 9, an XY movement portion 10a is provided and guided by four Y plate spring portions 11. By this constitution, the XY movement portion 10a is movably guided in X and Y directions. At a center of the XY movement portion 10a, a through hole 12 is provided.

With respect to drive in X direction, an X piezoelectric element 13 is provided and a plunger 14 is disposed opposite to the piezoelectric element 13. The plunger 14 is a device for pressing something at a certain force by the action of spring. By a force generated by the plunger 14, the X movement portion 9 is pressed against the piezoelectric element 13. This pressing force is important. The piezoelectric element is an element expanding and contracting depending on a voltage but is susceptible to tensile stress, so that it is required to be used in such a state that a compressive force is always exerted thereon.

Similarly, also with respect to drive in Y direction, a Y piezoelectric element 15 is provided between the X movement portion 9 and the XY movement portion 10 and a plunger 16 is provided opposite to the Y piezoelectric element 15. By a force generated by the plunger 16, the XY movement portion 10a is pressed against the Y piezoelectric element 15.

By controlling voltages to be applied to the X piezoelectric element 13 and the Y piezoelectric element 15, it is possible to control X and Y positions of the XY movement portion 10a. At four corner portions in a peripheral area of the XY scanner 7, mounting holes are provided.

In the through hole 12 of the XY scanner 7, as shown in FIG. 1, a cylindrical Z fine movement axis (shaft) 18 is disposed movably in Z direction. The Z fine movement axis 18 is formed of a cylindrical piezoelectric element provided with electrodes at inner and outer peripheral surfaces thereof and expands and contracts in Z direction by applying a voltage to both of the electrodes. In this embodiment, a first scanner 10 movable in three-axis directions (X, Y and Z directions) is constituted by the XY scanner 7 and the Z fine movement axis 18. The first scanner 10 is connected to and controlled by a scanner control apparatus 48. The scanner control apparatus 48 is, e.g., a computer which is called a digital signal processor capable of effecting high-speed operation (processing).

At an end of the Z fine movement axis 18, a mounting block 19 is provided. To the mounting block 19, a vibration imparting piezoelectric actuator 20 and a probe 22 via a probe holder 21 are fixed. The probe 22 is inclined with respect to Z direction as shown in FIG. 3. This is because the probe 22 is disposed in a direction inclined with respect to the member 1 to be measured so as to alleviate abutment of a portion other than the tip of the probe against the member 1. This is important in the case of measuring a recessed surface of the member to be measured.

Further, when the vibration imparting piezoelectric actuator 20 is connected to an unshown oscillation circuit to cause vibration, it is possible to constitute the above described AC mode atomic force microscope. More specifically, it is possible to measure a force exerted between the probe and the member to be measured while vibrating the probe at high frequency. On the other hand, when the vibration imparting piezoelectric actuator 20 is omitted, it is possible to constitute the DC mode atomic force microscope. More specifically, it is possible to directly measure a static force exerted between the probe and the member to be measured without vibrating the probe.

In either of the AC measurement mode and the DC measurement mode, a point affecting measurement accuracy is that whether or not bending of the probe can be detected with accuracy. Hereinafter, for convenience of explanation, description will be continued on the precondition that the measurement mode is the DC measurement mode.

A light source 23 such as semiconductor laser is fixedly provided to the housing 6 and light emitted from the light source 23 is guided into an optical fiber 24. As the light source 23, it is possible to use a semiconductor laser part of a pigtail type. The optical fiber 24 is connected to an optical fiber emission end 25. When a single mode optical fiber is employed as the optical fiber 24, light is emitted from a very narrow area having a diameter of several microns, so that such an optical fiber emission end can be used as a good point source of light. The optical fiber emission end 25, i.e., the point source of light is fixed at an end portion of a second scanner 26 as a tube scanner fixedly provided to the housing 6.

Figure 4:
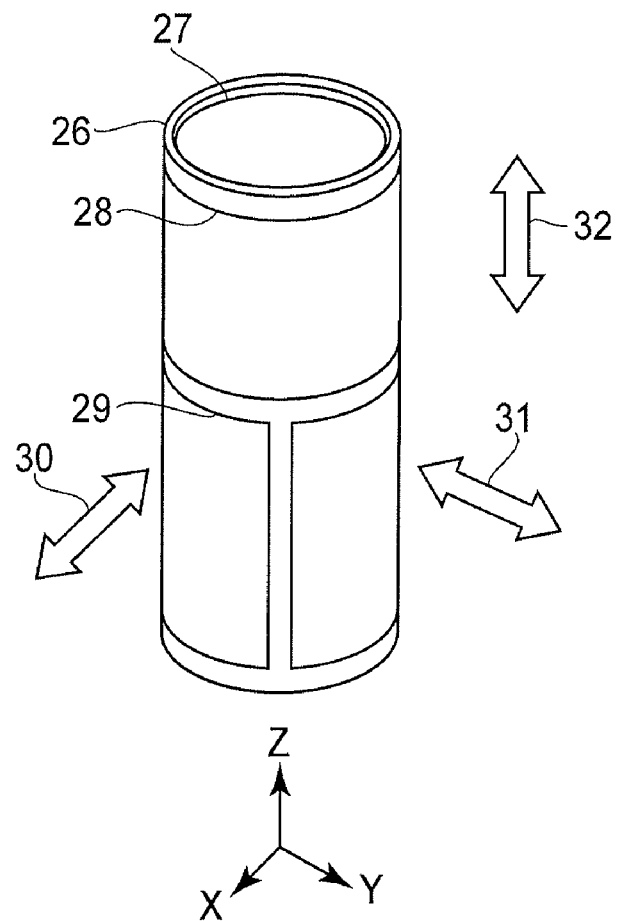
FIG. 4 is a perspective view showing the second scanner of the apparatus used in Embodiment 1.

FIG. 4 shows a constitution of the second scanner 26. The second scanner 26 is a cylindrical piezoelectric element provided with a plurality of electrodes. At an inner portion of the piezoelectric element, a common electrode 27 is provided. At an outer upper portion, Z direction electrode 28 is provided, and at an outer lower portion, four-piece electrode 29 is provided. For convenience of explanation, a potential of the common electrode 27 is taken as zero volts.

In such a constitution, by controlling a voltage between the common electrode 27 and the Z direction electrode 28, the piezoelectric element expands and contracts in Z direction indicated by an arrow 32. When voltages of opposite polarities are applied to two opposite electrodes, respectively, of the four-piece electrode 29, one of the opposite electrodes expands and the other electrode contracts to bend the cylindrical tube. As a result, an end of the second scanner 26 moves in X direction indicated by an arrow 20 or Y direction indicated by an arrow 31.

The second scanner 26 is fixed to the housing 6 at its lower end and at its upper end, the optical fiber emission end 25 is fixed. For this reason, the point source of light constituted by the optical fiber emission end 25 is movable in X, Y and Z directions. Such a moving operation is controlled by the scanner control apparatus 48. An operation of the scanner control apparatus 48 will be described later.

Optical system constituting members including a lens 33, a polarization beam splitter 34, a quarter-wave plate 35, a prism 36, a light detection means 37, a black plate 38, and a dichroic mirror transparent to wavelength band of the light source 23 are fixedly provided to the housing 6.

Measuring light emitted from the optical fiber emission end 25 is converged by the lens 33 and enters the polarization beam splitter 34. Light reflected by the polarization beam splitter 34 is unnecessary, thus being absorbed by the black plate inclined with respect to the optical axis. This is because even when light regularly reflected by the surface of the black plate is generated, an influence thereof can be eliminated. On the other hand, light passing through the polarization beam splitter 34 passes through the quarter-wave plate 35 to be converted into circularly polarized light. An optical axis of the circularly polarized light is inclined by the prism 36 so that it corresponds to a reflection surface of the probe 22.

The measuring light further passes through the dichroic mirror 39 and is focused on a back surface side of the probe 22. In other words, a position of the lens 33 is roughly adjusted so that the focus of light is formed on the reflected surface of the probe 22.

As shown in FIG. 2(a), in order to form the focus on the probe 22, the positions of the light source 23 and the probe 22 via the lens 33 may provide a conjugation relationship. More specifically, the following relationship (1) may be satisfied.

$$\frac{1}{f} = \frac{1}{L1} + \frac{1}{L2} \tag{1}$$

wherein L1 represents a distance between the light source 23 and the lens 33, L2 represents a distance between the lens 33 and the probe 22, and f represents a focal length (distance) of the lens 33.

In this case, when the light source 23 is moved in X direction, the focal length is moved in X direction at a ratio of L2:L1.

As described above, in this embodiment, the optical fiber emission end 25 is used as the point source of light. The point source of light is fixed to the second scanner 26, so that it is possible to move the focus to a desired position by moving the second scanner 26.

The measuring light reflected by the probe 22 again passes through the dichroic mirror 39 and the prism 36 to change its direction so that the optical axis is again parallel to Z axis. The light further passes through the quarter-wave plate 35, so that the circularly polarized light is reconverted into linearly polarized light. However, at this time, a direction of the linearly polarized light is changed from that of the original linearly polarized light by 90 degrees. For this reason, the linearly polarized light is reflected by the polarization beam splitter 34 to enter the light detection means 37.

The light detection means 37 is a photodiode which is known as, e.g., a four-piece photodiode or a position sensor. The light detection means 37 outputs current, from four electrodes, depending on a position of incident light. The resultant signal is sent to an amplifier 45 for the light detection means. The amplifier 45 converts the current signal from the photodiode into a voltage by a current-voltage conversion circuit and perform analog operation by an operational amplifier, so that the current signal is finally converted into a light amount signal 46 proportional to an amount of light entering the light detection means 37 and a light position signal 47 representing a position of the center of gravity of incident light.

When the probe 22 is bent, an angle of the reflected light is changed to move the position of the center of gravity of light entering the light detection means 37. At this time, a degree of bending of the probe 22 is increased by the movement of the position of the center of gravity, so that the optical system functions as a so-called "optical lever". Further, the bending of the probe 22 is caused by a force acting between the member 1 to be measured and the probe 22, i.e., atomic force, so that the light position signal 47 of the light detection means 37 represents the atomic force.

The light amount signal 46 and the light position signal 47 are sent to the scanner control apparatus 48. Incidentally, in order to reduce noises of the outputs from the light detection means 37, the light amount signal 46, and the light position signal 47, the use of a lock-in amplifier is very effective. The lock-in amplifier is a device for selectively amplifying only a frequency component which has been determined in advance. A signal is modulated by a preliminarily determined frequency and a signal synchronized with the same frequency is obtained by the lock-in amplifier. As a result, it is possible to substantially remove components other than the frequency component. In this case, the modulation is performed at a frequency at least ten times higher than a frequency of movement of the scanner. Assuming that a scanner characteristic is a two-dimensional system, vibration damping can be expected substantially on the order of the square of the frequency. Thus, it is possible to prevent an increase in noise caused by the scanner operation. As the light modulation method, in addition to modulation of light intensity of the light source, it is possible to employ the above described AC mode, i.e., a method wherein the cantilever is vibrated at high frequency. In the former case, both of the light amount signal 46 and the light position signal 47 are modulated, so that improvement in noise can be expected with respect to both of the signals. In the latter case, the light position signal 47 is modulated, so that the noise improvement can be expected with respect to only the signal 47.

Further, a camera 43 and a black plate 44 are fixedly provided to the housing 6. The dichroic mirror 39 reflects only light of a particular wavelength, so that it is possible to receive an image of the surface of the member to be measured by the camera 43 with the light of the particular wavelength. On the other hand, light other than the light of the particular wavelength passes through the dichroic mirror 39. However, the black plate 44 is disposed on the optical axis, so that the light passing through the dichroic mirror 39 do not enter the camera 43, thus being prevented from disturbing the image. The camera 43 is connected to an unshown monitor on which the image is displayed.

Next, an operation of the scanner control apparatus 48 will be described. This apparatus is constituted by a computer capable of performing high-speed operation and a drive amplifier for actuating the scanner and is capable of operating a plurality of control programs in a multitasking manner.

Figure 5:
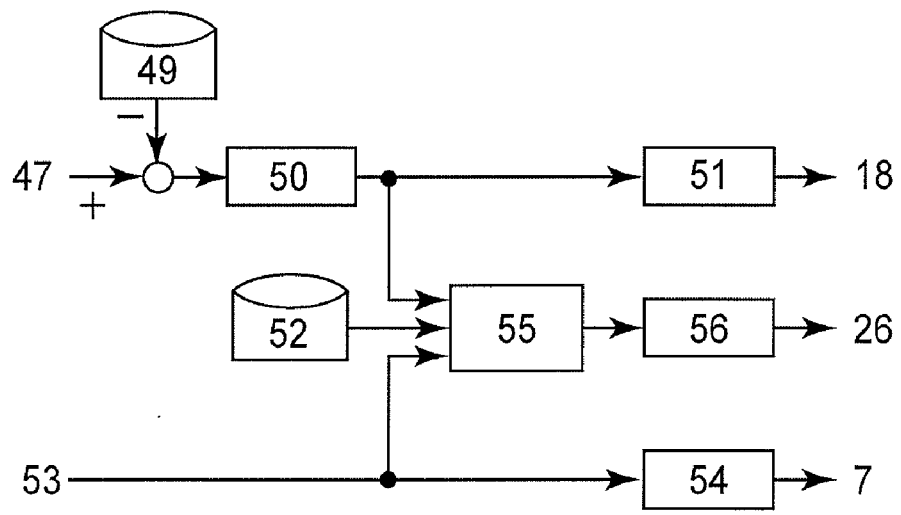
FIG. 5 is a block diagram for illustrating a constitution of a scanner control apparatus of the apparatus used in Embodiment 1.

FIG. 5 is a control block diagram of the scanner control apparatus 48.

First, a feedback control system of bending of the probe 22 will be described. As described above, the bending of the probe 22 is caused by the force acting between the member 1 to be measured and the probe 22, i.e., the atomic force. For this reason, the light position signal 47 of the light detection means 37 represents the atomic force. A target atomic force is determined in advance and a light position target value 49 of corresponding to the target atomic force is determined.

From the light position signal 47, the determined light position target value 49 is subtracted and fed back to the Z fine movement axis 18 through a control system including a Z fine movement axis compensator 50 and a Z fine movement axis driver amplifier 51. The Z fine movement axis compensator 50 is required for keeping stably the feedback control system. For example, PID control is known.

By this control system, it is possible to operate the Z fine movement axis 18 of the first scanner 10 so as to cancel a change in light position signal 47. The light position signal 47 represents the atomic force and the Z fine movement axis 18 changes a relative distance between the probe 22 and the member 1 to be measured. More specifically, by performing the feedback control, it is possible to measure information on a height at which the atomic force is a constant value. This measurement is performed by a so-called null-balance method (zero method).

By the control according to the null-balance method, the Z axis of the first scanner 10 is vertically moved along projections and recesses of the member 1 to be measured. When the vertical movement is large, the probe 22 is largely moved in the optical axis direction of the "optical lever". As a result, the focus is not formed on the probe, thus resulting in a large problem in a conventional method. According to this embodiment, it is possible to adjust the position of the focus in the optical axis direction in accordance with displacement of Z axis of the first scanner 10, so that the problem in the conventional method has been solved as described later.

A target position 53 of XY scanning for scanning the entire measuring range of the member 1 to be measured is created and the XY scanner 7 is driven via the XY scanner driver amplifier 54.

Further, the position conversion data is preliminarily stored in a storing portion. The position conversion data is data for position relationship between the X, Y and Z positions of the first scanner 10 having the Z fine movement axis 18 and corresponding positions of the second scanner 26. By satisfying the position relationship, the focus position of the "optical lever" optical system coincides with the position of the probe 22. A preparation method of the position conversion data will be described later.

The position conversion data 52 and the position of the first substrate 10, i.e., an output of the compensator 50 and the target position of the XY scanning are inputted into a position converter 55 and a resultant output is inputted into the scanner driver amplifier 56 to drive a piezoelectric actuator portion of the second scanner 26. The position converter 55 is a coordinate conversion processing device for converting X, Y and Z positions as an input of the first scanner 10 into X, Y and Z positions as an output of the second scanner 26 by using the position conversion data 52.

The position conversion data 52 will be described more specifically.

The X, Y and Z positions of the first scanner 10 are represented by a vector Xn, and those of the second scanner 26 are represented by a vector Yn. Here, a subscript n is any one of 1, 2 and 3. For example, $X_1$, $X_2$ and $X_3$ represent X position, Y position and Z position of the first scanner, respectively. Coordinate conversion is effected according to the following formula (2):

$$Y_m = \sum_{i=0}^{n} \sum_{j=1}^{3} c_{i,m,j} X_j^i \quad (2)$$

wherein m=1, 2 or 3 and a coefficient $c_{i,j,m}$ represents the position conversion data 52.

The formula (2) represents an input/output relationship as a power polynomial of n-th degree. According to the formula (2), it is possible to perform such a conversion that a nonlinear component having the degree of 2 or more is taken into consideration.

For example, a polynomial for correcting only offset and magnification can e realized by taking the degree as 1 and modifying the formula (2) into the following formula (3):

$$Y_1 = c_{0,1,1} + c_{1,1,1} X_1$$

$$Y_2 = c_{0,2,2} + c_{1,2,2} X_2$$

$$Y_3 = c_{0,3,3} + c_{1,3,3} X_3 \quad (3)$$

Here, the offset means positional deviation between the focus position of the "optical lever" and the probe position and is corrected by the above formula (3), so that it is possible to cause the focus position and the probe position to coincide with each other.

Further, the magnification means a ratio of an amount of movement of the focus position moved by the second scanner 26 to an amount of movement of the first scanner 10 and is determined depending on a production error of mechanism parts or a magnification of the optical system for converging light from the point of source of light fixed to the second scanner 26 and focusing the light on the probe.

Further, in the case where the movement directions of the first substrate 10 and the second substrate 26 are slightly inclined, by adding coefficients taking the inclination into consideration to the above formula (3) to provide formula (4) shown below, it is possible to make correction. The added terms represent rotating matrix.

$$Y_1 = c_{0,1,1} + c_{1,1,1} X_1 + c_{1,1,2} X_2$$

$$Y_2 = c_{0,2,2} + c_{1,2,1} X_1 + c_{1,2,2} X_2$$

$$Y_3 = c_{0,3,3} + c_{1,3,3} X_3 \quad (4)$$

In a similar manner, it is also possible to make correction for a higher degree.

Figure 6:
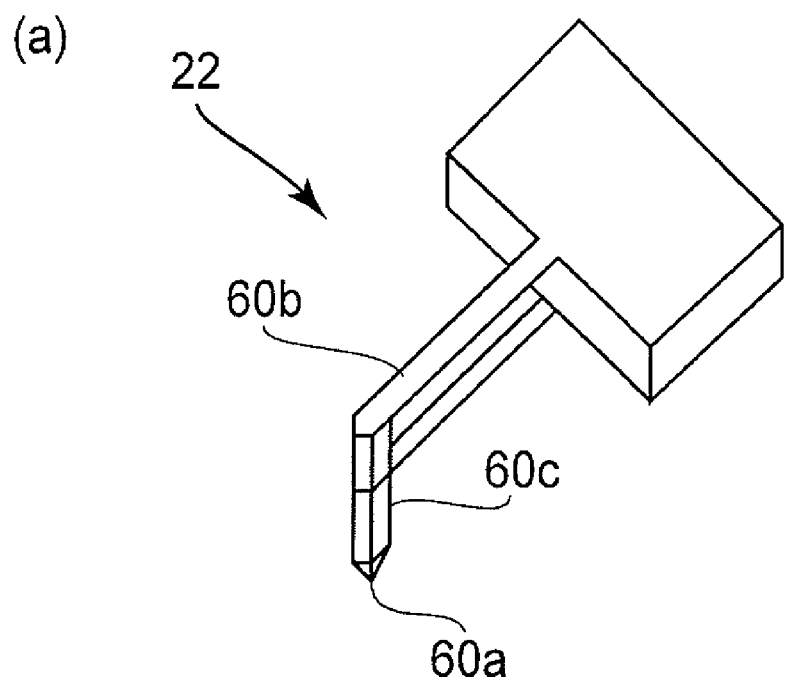
FIG. 6 is a schematic view for illustrating a probe of the apparatus used in Embodiment 1.
Figure 6:
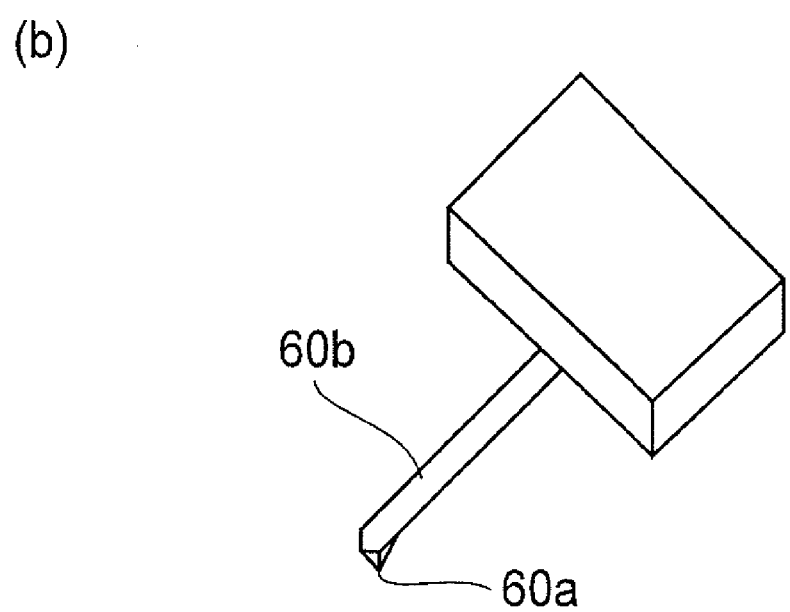

The probe 22 includes a pointed portion 60a for sensing atomic force between it and the member 1 to be measured and a cantilever 60b provided with a trunk portion 60c between the pointed portion 60a fixed thereto and the cantilever 60b, as shown in FIG. 6(a).

In a conventional probe shown in FIG. 6(b), a pointed portion is short, so that the probe cannot follow a deep recessed shape. In this case, it is possible to meet the recessed shape by increasing a length of the pointed portion. However, a plate spring is bent, so that a change in attitude of the pointed portion is large. In view of this problem, in this embodiment, the change in attitude of the pointed portion is decreased by providing two parallel plate springs constituting the cantilever 60b. Further, by providing the trunk portion 60c for prolonging the pointed portion, an upper plate spring has a reflection surface. In the present invention, it is desirable that the probe having such a plate spring structure is employed.

The measuring light is reflected by the reflection surface formed at an upper surface of the cantilever 60b and the position of the probe 22 is automatically detected while detecting an amount of light entering the light detection means 37. By using a detection result, it is possible to effect precise adjustment of the focus position.

Figure 7:
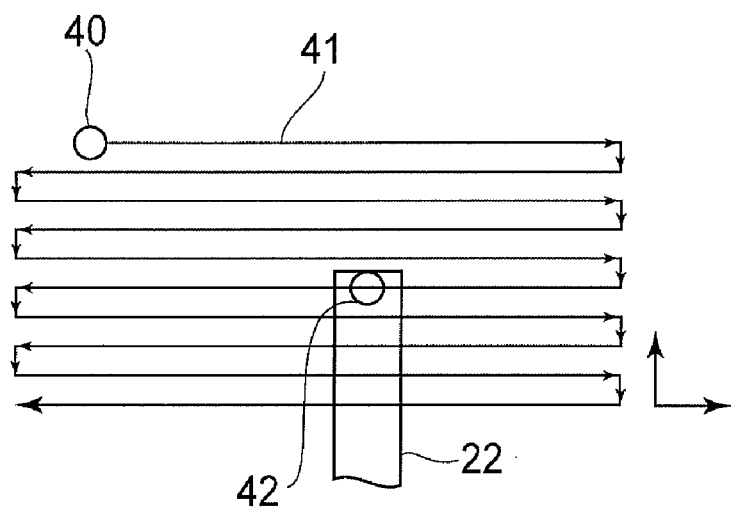
FIG. 7 is a schematic view for illustrating a focus of an optical system and a reflection surface of the probe in the apparatus used in Embodiment 1.

FIG. 7 is a schematic view of the probe 22 as seen from above. A focus 40 of the "optical lever" optical system is detected along a trace 41 having a meander shape as shown in FIG. 7 by scanning with the second scanner 26. An amount of light entering the light detection means 37 is increased when the focus position is located on the probe 22 during the scanning. When a signal of the light amount is outputted as a two-dimensional light amount (output) map, a position and shape of the probe can be read. As a result, it is possible to determine an optimum position (optimum focus position) for placing the focus 40 on the probe 22. The optimum probe 42 is a position where the focus 40 coincides with the reflection surface of the probe 22 to increase the amount of light entering the light detection means 37 and is located in the neighborhood of an end portion of the probe 22 to be largely bent.

A step of preparing the above described light amount map by effecting the scanning with the second scanner 26 is repeated by changing the position of the first scanner 10, whereby a table of the focus position corresponding to the position of the first scanner, i.e., the position conversion data can be prepared. By using this table, the second scanner 26 is controlled in synchronism with the first scanner 10, so that the focus position is capable of being always kept at the optimum position of the probe 22.

Figure 8:
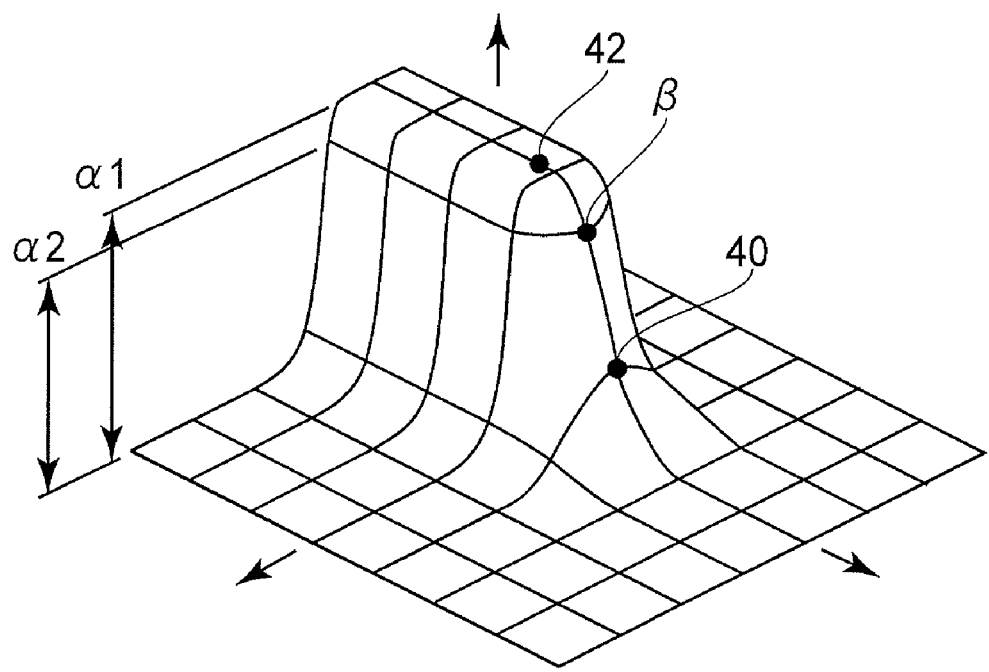
FIG. 8 is a schematic view showing a map of light amount for obtaining position conversion data of the apparatus used in Embodiment 1.

FIG. 8 shows the light amount map in this embodiment. An abscissa represents the position of the second scanner 26 and an ordinate represents the light amount signal 46. A maximum of the light amount is taken as $\alpha 1$. A threshold is taken as $\alpha 2$ which is an appropriate value not more than $\alpha 1$, e.g., 90% of $\alpha 1$. By the threshold $\alpha 2$, it is possible to draw a contour line as shown in FIG. 8. This contour line represents a contour of the probe 22. In the contour line, a point closest to the end of the probe 22 is taken as $\beta$. The position of $\beta$ can be regarded as the end of the probe 22. A point distant from the point $\beta$ by a certain length, e.g., equal to a spot size of light in a direction toward the fixed portion of the probe 22 is taken as the optimum position 42. This is because it is possible to obviate a large change in light amount caused by even slight deviation of the position of the point $\beta$ due to a movement error or the like of a scanning axis.

In a similar manner, it is possible to determine an optimum position in the optical axis direction of the second scanner. When the probe 22 is deviated in the optical axis direction, the reflected light is largely diverged to lower the amount of light entering the light detection means 37. A position at which the light amount is maximum is an optimum focus position in the optical axis direction. It is possible to ensure a sufficient amount of light by causing the focus of the optical system to follow the optimum position determined in the above described manner. Further, the focus position is close to the end of the probe 22, so that the probe 22 is bent largely. As a result, a measurement sensitivity is advantageously high.

However, the "optical lever" optical system has a small NA (numerical aperture), so that it is less sensitive to deviation in the optical axis direction and has a considerable depth of focus. For this reason, in the case where the deviation in the optical axis direction is small, the "optical lever" optical system is sufficiently practical even when control in the optical axis direction is omitted.

In the conventional technique, it has been difficult to detect the optimum focus position but in this embodiment, it is possible to detect the optimum position on the probe by monitoring an amount of light of the light detection means 37 while effecting scanning of the focus with the second scanner 26. Further, in the conventional technique, adjustment of the focus position has been complicated but in this embodiment, it is possible to always keep the focus position at the optimum position on the probe by preparing a table (position conversion data) of the optimum focus position and controlling the second scanner 26 in correspondence with the position of the first scanner 10 by means of the table. Further, in the conventional technique, alignment adjustment during replacement of the probe has been complicated but according to this embodiment, it is possible to simply meet the alignment adjustment since the detection of the focus position and the adjustment of the focus position can be automatically performed.

Figure 9:
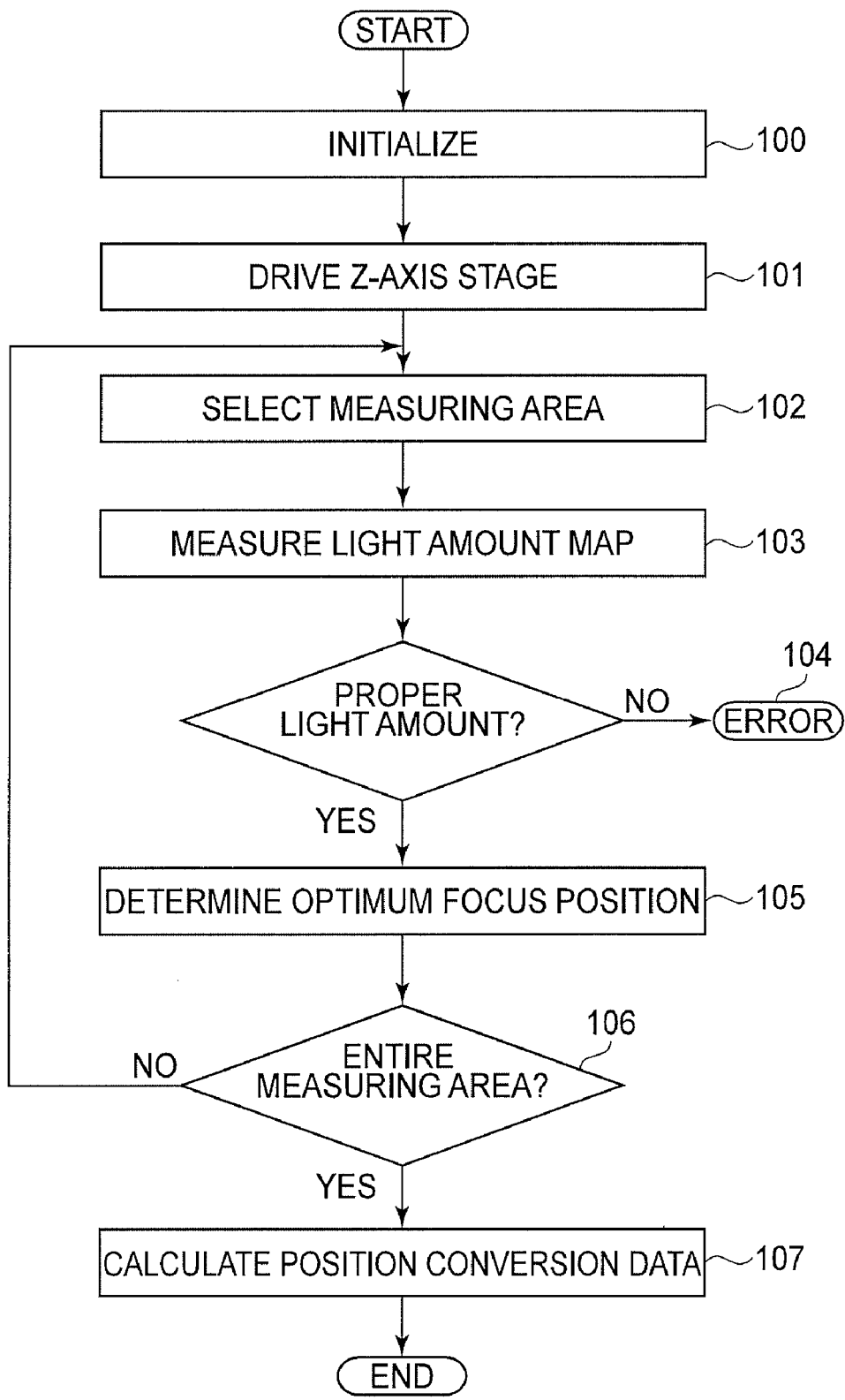
FIG. 9 is a flow chart for illustrating steps for obtaining the position conversion data of the apparatus used in Embodiment 1.

FIG. 9 is a flow chart for explaining a method of obtaining the position conversion data 52.

In the case where the degree of position conversion by the polynomial is increased, the number of the position conversion data 52 as a coefficient of the formula (2) described above is increased. Further, the coefficient includes factors, which are not determined theoretically, such as a production error of mechanism parts and an adjustment error of the optical system, thus requiring measurement.

First, the position conversion data 52 is initialized in step 100. It can be considered that the second scanner 26 cannot be actuated at all when an abnormal value is set as the position conversion data 52. For this reason, the position conversion data 52 is first initialized. As the initial value, it is possible to use a simple model represented by the above described formula (3). At this stage, it is not necessary that the position conversion data 52 is accurate, so that the theoretical study result represented by the formula (3) is sufficient.

In step 101, the Z(-axis) coarse movement stage 5 is moved upward, so that the member 1 to be measured is separated from the probe 22. In step 102, a position of the first scanner 10 is selected from a measuring area. The measuring area is divided into an finite number of lattices. Each of lattice points is successively selected and the first scanner 10 is moved to a position of the selected lattice point. In step 103, the optical system is subjected to scanning with the second scanner 26 to measure and obtain a map of the light amount signal 46.

In step 104, it is confirmed that the light amount is in a normal range. When the light amount is in an abnormal range, the procedure is terminated due to error. In the case where the entire light amount map has an insufficient light amount, error termination is effected since it is considered that alignment of the "optical lever" optical system is largely deviated or that the probe is detached from the fixed portion. In step 105, an optimum position on which the focus is placed is determined from the light amount map. As shown in FIG. 8, it is possible to read the position and the shape of the probe 22 from the light amount map, so that it is possible to obtain the optimum position 42 at which the focus 40 is optimally placed on the probe 22.

In step 106, when the entire measuring area is not covered completely, the first scanner is moved to a next position and the procedure is returned to step 102.

By this loop, a position of the second scanner 26 corresponding to a position of the first scanner 10 in order to realize the optimum focus position in the finite number of lattice points is obtained. This is sets of pairs of inputs and outputs, i.e., X and Y, represented by the above described formula (2).

In step 107, the position conversion data 52 is calculated. More specifically, by using the sets of pairs of inputs and outputs represented by formula (2), a coefficient is calculated according to the method of least squares. The formula (2) is a model for the polynomial, so that when residual error is large, accuracy can be improved by increasing the degree of the polynomial. The thus obtained coefficient is the position conversion data 52.

By using the above obtained position conversion data 52, the position of the second scanner 26 is controlled in correspondence with the position of the first scanner 10, so that it is possible to always keep the focus position at the optimum position of the probe 22.

In this embodiment, a search for the probe position is made by performing scanning with the second scanner 26. Similarly, it is also possible to obtain the position conversion data 52 by making the search for the probe position by performing scanning with the first scanner 10.

Figure 10:
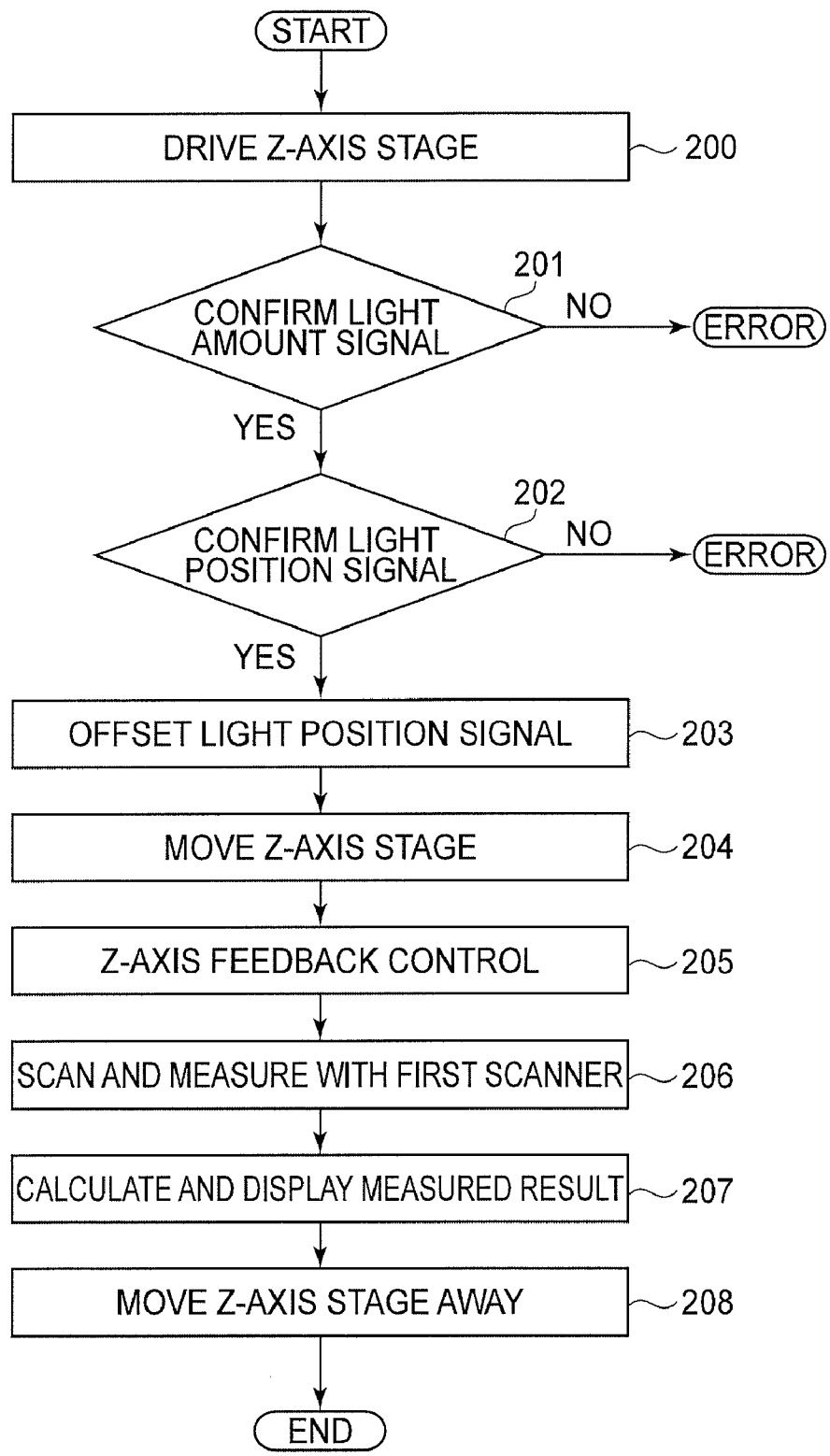
FIG. 10 is a flow chart for illustrating a measuring operation of the apparatus used in Embodiment 1.

FIG. 10 shows a flow chart of a measuring operation of the atomic force microscope.

First, in step 200, the 8 coarse movement stage 5 is moved upward and the member 1 to be measured is set to the XY coarse movement stage 2. In step 201, it is confirmed that the light amount signal 46 of the light detection means 37 is in a normal range. When the light amount signal 46 is in an abnormal range, the procedure is terminated due to error. For example, in the case where the light amount is insufficient, error termination is effected since it is considered that initial setting error such that alignment of the "optical lever" optical system is deviated or that the probe 22 is detached from the fixed portion is caused to occur. Further, in the former case (alignment deviation), by setting the position conversion data 52 again in accordance with the above described procedure, it is possible to effect measurement again.

In step 202, it is confirmed that the light position signal 47 of the light detection means 37 is in a normal range. When the light position signal 47 is in an abnormal range, error termination is effected. The light position signal 47 represents bending of the probe 22 enlarged by the action of the "optical lever". In the case where the light position signal 47 is abnormally larger than a preliminarily determined threshold, error termination is effected since it is considered that the probe 22 is largely bent originally.

In step 203, offset of the light position signal 47 of the light detection means 37 is set so that an output is zero. In a state in which the probe 22 and the member 1 to be measured are apart from each other, the offset of the light position signal 47 is effected in order to cancel minute alignment error of the "optical lever" optical system and offset error of an electrical system. In step 204, the Z coarse movement stage 5 is moved until the light position signal 47 reaches a preliminarily set value. The light position signal 47, as described above, represents the bending of the probe 22 enlarged by the action of the "optical lever", i.e., a force acting between the probe 22 and the member 1 to be measured. The Z coarse movement stage 5 is moved upward and downward until the force reaches the preliminarily set value. As a result, the probe 22 is brought very close to the member 1, so that an influence of atomic force is shown.

In step 205, feedback control is effected with respect to the Z fine movement axis 18 so that an output of the light position signal 47 is constant. By this feedback control, as described above, it is possible to perform measurement according to the null-balance method. When the feedback control is effected, the force acting between the probe 22 and the member 1 to be measured is constant, so that the Z coarse movement stage 5 is moved upward and downward depending on projections and recesses of the member 1.

In step 206, scanning with the first scanner 10 is effected in the measuring range. In the measuring range, scanning with the probe 22 is effected to record the light position signal 47 and the position of the Z fine movement axis 18 in the entire measuring range. At that time, as described above with reference to the block diagram shown in FIG. 5, the position of the second scanner 26 is controlled in correspondence with the position of the first scanner 10, i.e., the positions of the Z fine movement axis 18 and the XY scanner 7, by using the position conversion data 52. By this control, the focus of the "optical lever" optical system always follows the surface of the probe 22.

In step 207, a measurement result is calculated displayed, and stored. The measurement result is shown in a graph having an abscissa representing XY position of the first scanner 10 and an ordinate representing a position of the Z fine movement axis 18.

With respect to the Z fine movement axis 18, feedback control is effected so that the light position signal 47 representing the force exerted between the probe 22 and the member 1, i.e., atomic force is constant. Accordingly, the measurement result represents projections and recesses of the member 1 providing a constant atomic force.

In the feedback control, control error (system deviation) occurs even when a degree of the control error is slight. Even when there is the control error, it is possible to make correction by adding a value obtained by converting an output of the light position signal 47 into displacement in Z direction to a measured value. A conversion ratio at this time is a ratio between an amount of movement of the member 1 to be measured and an amount of movement of the light position signal 47. This ratio can be measured by gradually pushing the probe 22 into the member 1 in the apparatus shown in FIG. 1. Further, it is also possible to calculate the ratio by using a computational model of atomic force.

In step 208, the Z coarse movement stage 5 is moved upward and the member 1 to be measured is detached from the XY coarse movement stage 2.

According to this embodiment, it is possible to always place the focus position on the probe 22 by adjusting the focus position in correspondence with the position of the first scanner 10 by means of the second scanner 26 although it has been difficult to effect high-accuracy measurement in the conventional technique since the positions of the focus and the probe are inevitably deviated from each other.

Further, in JP-A Hei 5-312561 described above, the end of the probe scanner cannot be reduced in size, so that it has been difficult to perform measurement with high accuracy. However, in this embodiment, the light source is not required to be disposed at the end of the probe scanner, so that the probe end can be reduced in size.

Further, in the conventional technique, it has been difficult to effect the high-accuracy measurement since it is impossible to prevent the deviation in the optical axis direction of the probe. However, according to this embodiment, it is possible to adjust a three-dimensional position of the focus as described above, so that it is possible to prevent the deviation in the optical axis direction. Further, by monitoring the light amount of the light detection means with the second scanner, it is possible to detect the optimum focus position.

In the conventional technique, adjustment of the focus position has been complicated but according to this embodiment, it is possible to always keep the focus position at an optimum portion for the probe by preparing a table for the optimum focus position and controlling the position of the second scanner in correspondence with the first scanner by means of the table.

In the conventional technique, alignment adjustment during replacement of the probe has been complicated. However, according to this embodiment, an operation or judgement by an operator is not required for detection of the focus position and adjustment of the focus position, so that the alignment adjustment can be performed automatically, thus being effected simply.

Incidentally, a basic function of the optical system is not changed even when the order of arrangement of optical members constituting the optical system is changed. In this embodiment, these members are disposed in the order of the light source, the lens, the polarization beam splitter, the quarter wave plate, the prism, and the dichroic mirror. It has been known that a transmission intensity of light beam entering the surface of a dielectric member in a state in which the light beam inclines with respect to the dielectric member surface varies depending on a direction of the polarized light. The circularly polarized light passing through the quarter-wave plate and entering the prism is changed to elliptically polarized light by the above effect. Thus, the light beam reflected by the probe and entering the quarter-wave plate is changed to the elliptically polarized light. Accordingly, light which is not returned to the linearly polarized light is slightly generated and passes through the polarization beam splitter, thus being returned to the light source side. This light is unnecessary stray light, so that there is a possibility that the light lead stop noise. For this reason, the positions of the wave plate and the prism may be replaced with each other, whereby the above possibility can be eliminated since the influence of the inclined surface of the prism is removed.

In this embodiment, the "optical lever" optical system is disposed on the transmission side of the dichroic mirror and the camera is disposed on the reflection side but a similar effect can be achieved even when the positions of these members are changed to each other. Further, in this embodiment, the first scanner is constituted by the combination of the XY scanner and the Z fine movement axis but a similar effect can be obtained even when the first scanner is constituted by the tube scanner. Similarly, the similar effect can also be achieved even when the second scanner is constituted by the combination of the XY scanner and the Z fine movement axis.

Further, in this embodiment, the emission end of the optical fiber as the point source of light is fixed to the second scanner but it is also possible to realize a similar function even when the lens is moved or the light source and the lens are simultaneously moved.

In this embodiment, it is preferable that an output signal of the light detection means is sent to the lock-in amplifier and a synchronizing frequency of the lock-in amplifier is at least 10 times an operating frequency of the scanner. In order to effect the high-accuracy measurement, it is important to take various countermeasures against disturbance. As a large noise source, factors such as a change in light amount of illumination light for the measuring apparatus and vibration and electrical noise in synchronism with the operation of the scanner can be considered. These noises are alleviated by modulating a signal with a preliminarily set frequency and utilizing only the frequency-modulated signal. When the signal-modulating frequency is set to be at least 10 times the operating frequency of the scanner, it is possible to considerably alleviate the influence of the noises caused by movements of the first and second scanners. For example, assuming that the characteristic of the scanner is a two-dimensional system which is an ordinary mechanical characteristic, when the frequency is increased by 10 times the operating frequency of the scanner, response to the same disturbance is attenuated so as to be about $1/100$. When the frequency is further increased, it is possible to move effectively attenuate the response.

Further, as means for modulating the signal, a similar function is realized by employing, e.g., a method of modulating a light intensity of the light source, a method using the second scanner as a focus position moving means, a method vibrating the probe, etc.

In this embodiment, the focus is formed on the reflection surface of the probe. However, in an actual optical system, the position of the focus is a position of beam waist, is that the focus does not mean a mathematical point.

Embodiment 2

Figure 11:
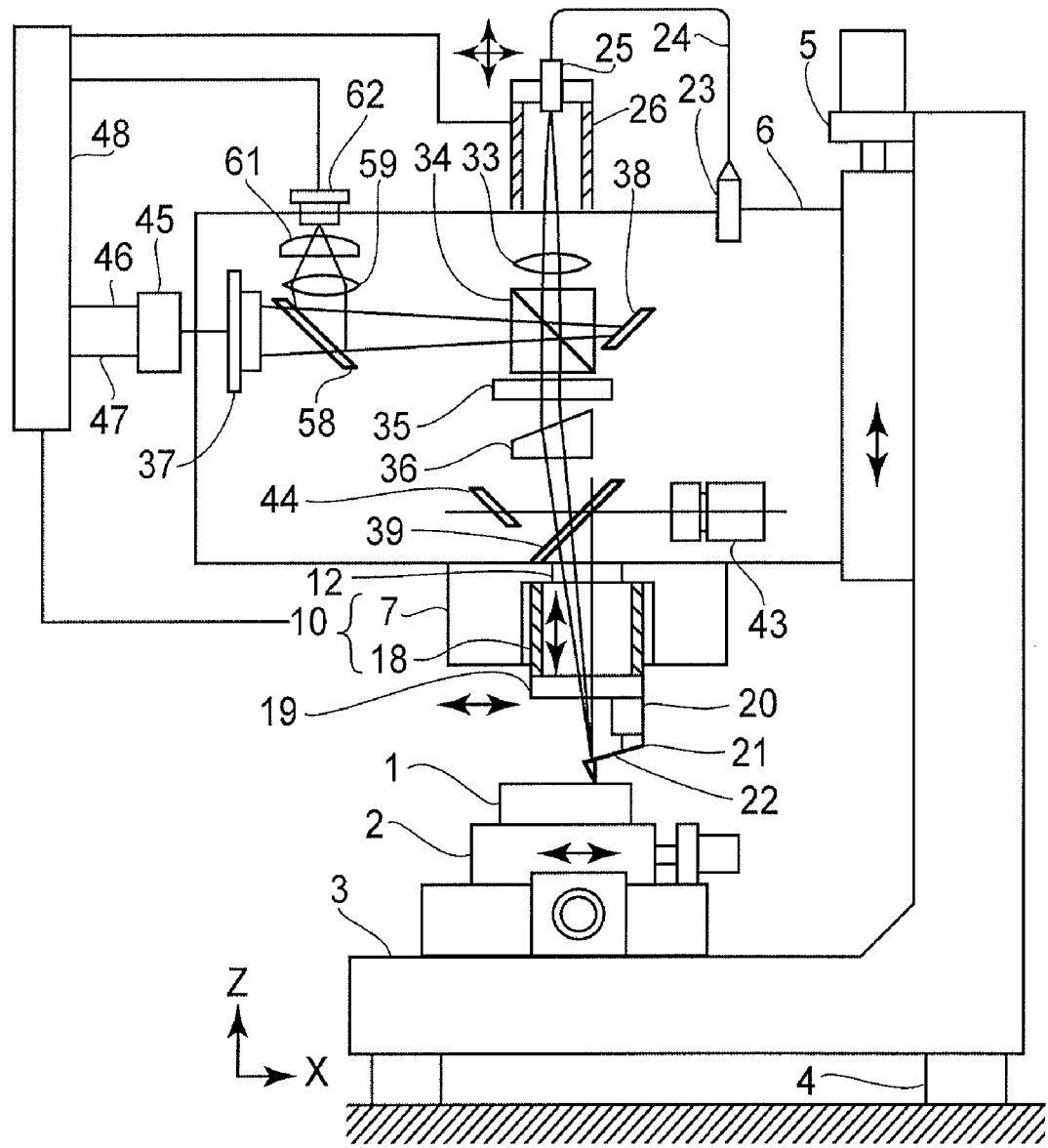
FIG. 11 is a schematic view for illustrating Embodiment 2.

FIG. 11 illustrates an atomic force microscope according to Embodiment 2. The atomic force microscope of this embodiment has the same constitution as that of the atomic force microscope of Embodiment 1 except that an auto focus apparatus is incorporated in an optical path of reflected light from the probe 22.

The auto focus apparatus is fixed to the housing and includes a half mirror 58, a lens 59, a cylindrical lens 61, and a four-piece photodiode 62.

Light reflected by the probe 22 is diffusive light since focus thereof is placed on the probe 22. The light is reflected by the beam splitter 34 and enters the half mirror 58. The transmitted light enters the light detection means 37 and the reflected light is converted into light converged by the lens 59 and passes through the cylindrical lens 61 to enter the four-piece photodiode 62.

The auto focus apparatus utilizing astigmatism described above introduces therein light branched by the half mirror disposed in the optical path of the light reflected by the reflection surface of the probe. In addition to the light amount map, by using an output of the auto focus apparatus, a position of the probe is calculated. Also in the optical axis direction, the light reflected by the probe diffuses, so that the amount of light entering the light detection means is decreased. For this reason, similarly as in the case of the direction perpendicular to the optical axis, an optimum position can be searched while detecting the light amount. However, the NA of the "optical lever" optical system is small, so that the optical system is less sensitive to deviation in the optical axis direction, i.e., has a large depth of focus. Accordingly, the deviation in the optical axis direction detectable by the light amount of the light detection means is low in sensitivity.

In this embodiment, the light reflected by the probe is branched by the half mirror and deviation thereof in the optical axis direction is detected by the auto focus apparatus. The auto focus apparatus has some types but the auto focus apparatus utilizing the astigmatism as shown in FIGS. 12 and 13 has been widely used.

Figure 12:
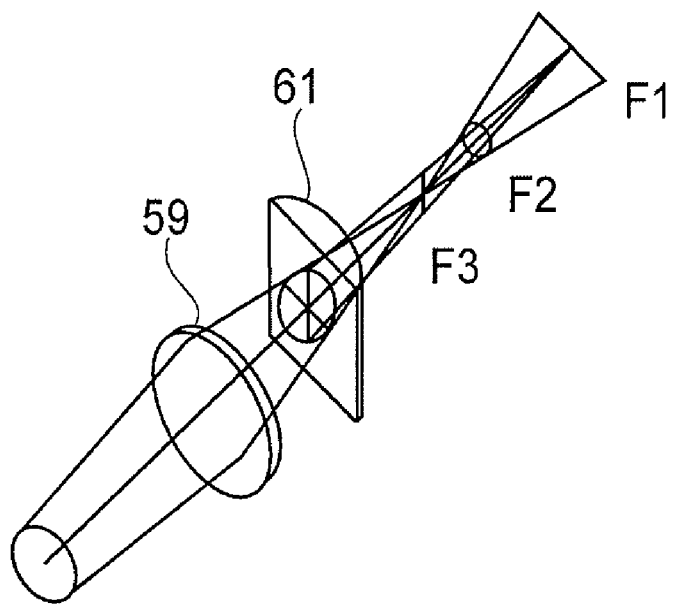
FIG. 12 is a schematic view for illustrating an auto focus apparatus of an apparatus used in Embodiment 2.

Referring to FIG. 12, the light reflected by the probe is diffused, so that it is first converted into converging light. When the light passes through the cylindrical lens 62, strong astigmatism is generated. F1 represents a focus position at which light is converged by the action of the lens alone. In this embodiment, the focus position F1, a light intensity distribution is extended in a lateral (horizontal) direction by the influence of the cylindrical lens 61. F3 represents a composite focus of the lens 59 and the cylindrical lens 61. At this position, a light intensity distribution is extended in a vertical direction. At a position of F2 which is an intermediary position between F1 and F3, a light intensity distribution assumes a circular shape with a balance between those at the positions of F1 and F2.

Figure 13:
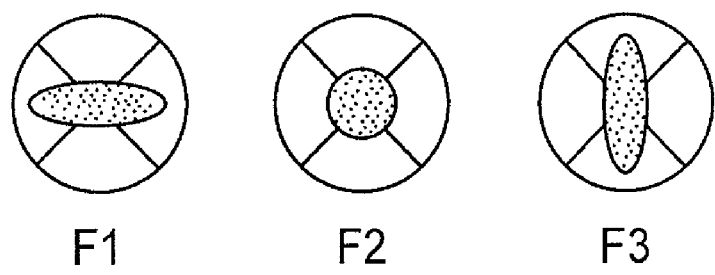
FIG. 13 is a schematic view for illustrating an action of autofocusing of the apparatus used in Embodiment 2.

FIG. 13 shows light intensity distributions at a light-receiving surface of the four-piece photodiode 62 at the positions of F1, F2 and F2. At the position of F1, the light intensity distribution is extended laterally, so that two signals from left and right diodes of four diodes are stronger than those from upper and lower diodes. At the position of F2, the circular light intensity distribution is created, so that an output from each of the four diodes is identical to each other. Further, at the position of F3, two signals from the upper and lower diodes are stronger than those from the right and left diodes.

Thus, by using the four-piece photodiode 62, it is possible to detect that the position of the focus is deviated in what direction. The auto focus apparatus used in this embodiment is capable of providing high accuracy in a method in which deviation of the focus in the optical axis direction is detected only by the light intensity.

Accordingly, by measuring the deviation in the optical axis direction using the auto focus apparatus in addition to measurement of the deviation in the direction perpendicular to the optical axis using the light amount of the light detection means 37, it is possible to obtain the position conversion data also in the optical axis direction with high accuracy.

As described above, the measurement accuracy is improved even with respect to the deviation in the optical axis direction by the auto focus apparatus, so that it is possible to cause the focus position to accurately coincide with the probe position. As a result, the measurement accuracy can be further improved. In addition, it is also possible to obtain the position conversion data in all the directions with high accuracy.

As described above, in the case where the measurement according to the null-balance method in which the feedback control is effected with respect to the Z fine movement axis so that the force, due to the bending of the probe, acting between the probe and the member to be measured is constant, the probe is moved upward and downward depending on projections and recesses of the surface of the member to be measured. By this upward and downward movement of the probe, the focus position of the "optical lever" optical system is also deviated in the optical axis direction. However, in this embodiment, it is possible to obtain the position conversion data also in the optical axis direction with high accuracy, so that it is possible to correct the deviation in the optical axis direction with high accuracy. Particularly, a roughened surface is subjected to measurement, displacement of the Z fine movement axis of the probe is large. For this reason, the technique of this embodiment is very important.

Embodiment 3

Figure 14:
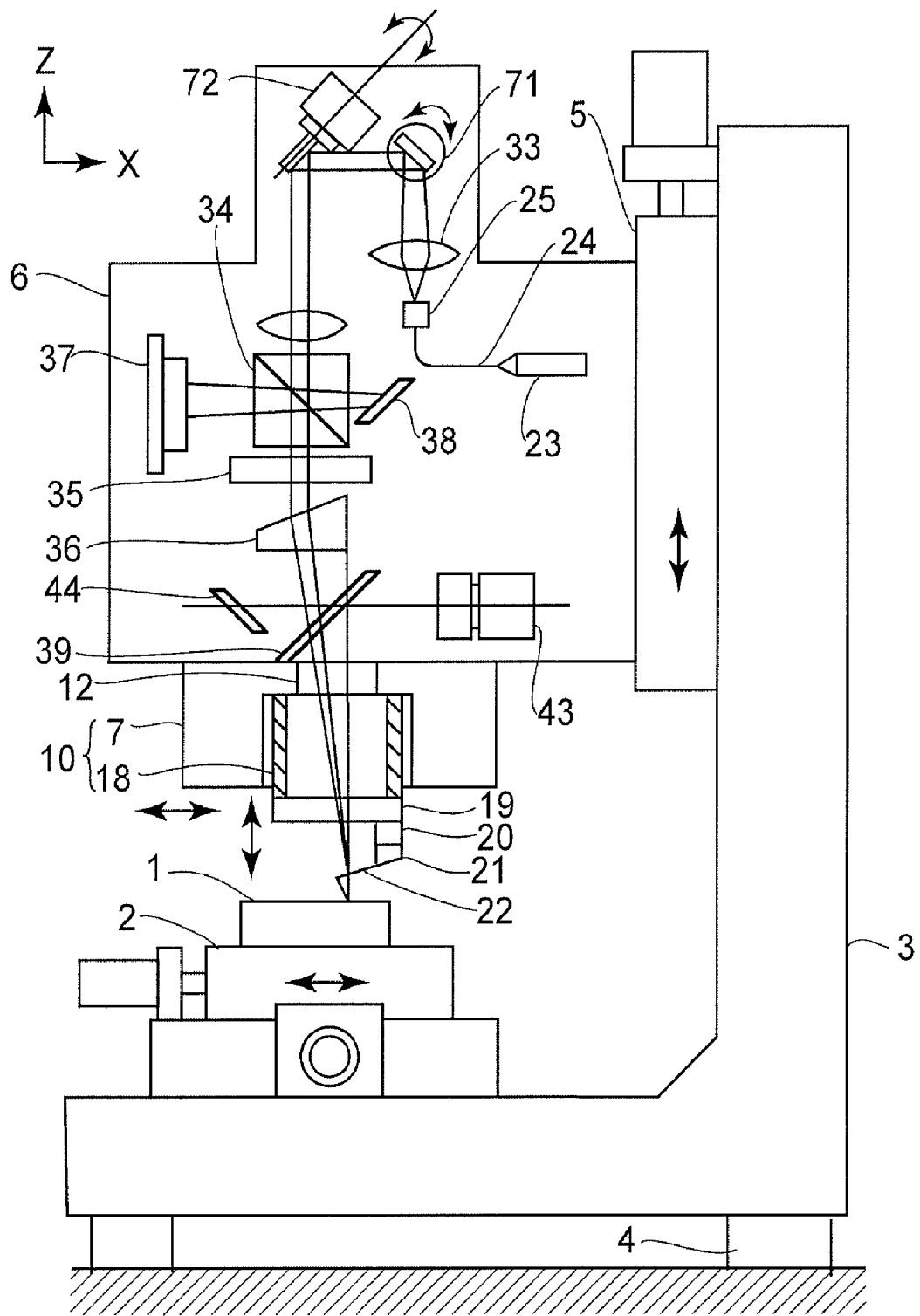
FIGS. 14, 15, 16 and 17 are schematic views for illustrating Embodiments 3, 4, 5 and 6, respectively.

FIG. 14 illustrates an atomic force microscope according to Embodiment 3. The atomic force microscope of this embodiment has the same constitution as that of the atomic force microscope according to Embodiment 1 except that galvanomirrors 71 and 72 are incorporated therein in an optical path of reflected light from the probe 22.

The galvano-mirror has been widely used as a light polarizing device capable of controlling an angle of a mirror at high speed by utilizing electromagnetic force etc. It is also possible to control the direction of light in two directions by combining two galvano-mirrors each capable of controlling one angle of rotation. Further, by disposing a planar galvanomirror using a torsion bar in the optical system, the focus position can be moved at high speed.

In this embodiment, a light source 23 such as a semiconductor laser is provided fixedly to the housing 6 so that emitted light is guided into the optical fiber 24. The emission end 25 of the optical fiber, i.e., a point source of light is fixed to the housing 6, so that converging light ray is obtained by the lens 33 fixed also to the housing 6. The two galvano-mirrors 71 and 72 are provided fixedly to the housing 6 and when the conversing light ray is reflected by the two galvano-mirrors 71 and 72, it is possible to change the direction of this light ray.

The galvano-mirror is a device for controlling an angle of a mirror reduced in size and weight utilizing electromagnetic force or the like, e.g., a device having such a structure that a mirror is fixed to a rotational axis of a servomotor. By employing the small-size mirror and a high-output motor, it is possible to change the direction of the light ray at high speed.

By adjusting the angle of the galvano-mirrors, the direction of the light ray is changed, so that the focus position can be changed.

In this embodiment, the galvano-mirrors are used, so that compared with Embodiment 1, it is possible to effect higher speed scanning of the focus position. Accordingly, it is possible to realize an atomic force microscope with shorter measuring time.

In this embodiment, the galvano-mirror including the mirror constituted by the rotation-type servomotor is used but may also be constituted by using a torsion lever prepared by processing a silicon wafer.

Further, in this embodiment, the mirrors are disposed between the lens 33 and the polarization beam splitter 34 but may also be disposed at any position so long as they are located in the optical path. For example, a similar function of changing the focus position is achieved by disposing the mirrors between the prism 36 and the probe 22.

Embodiment 4

Figure 15:
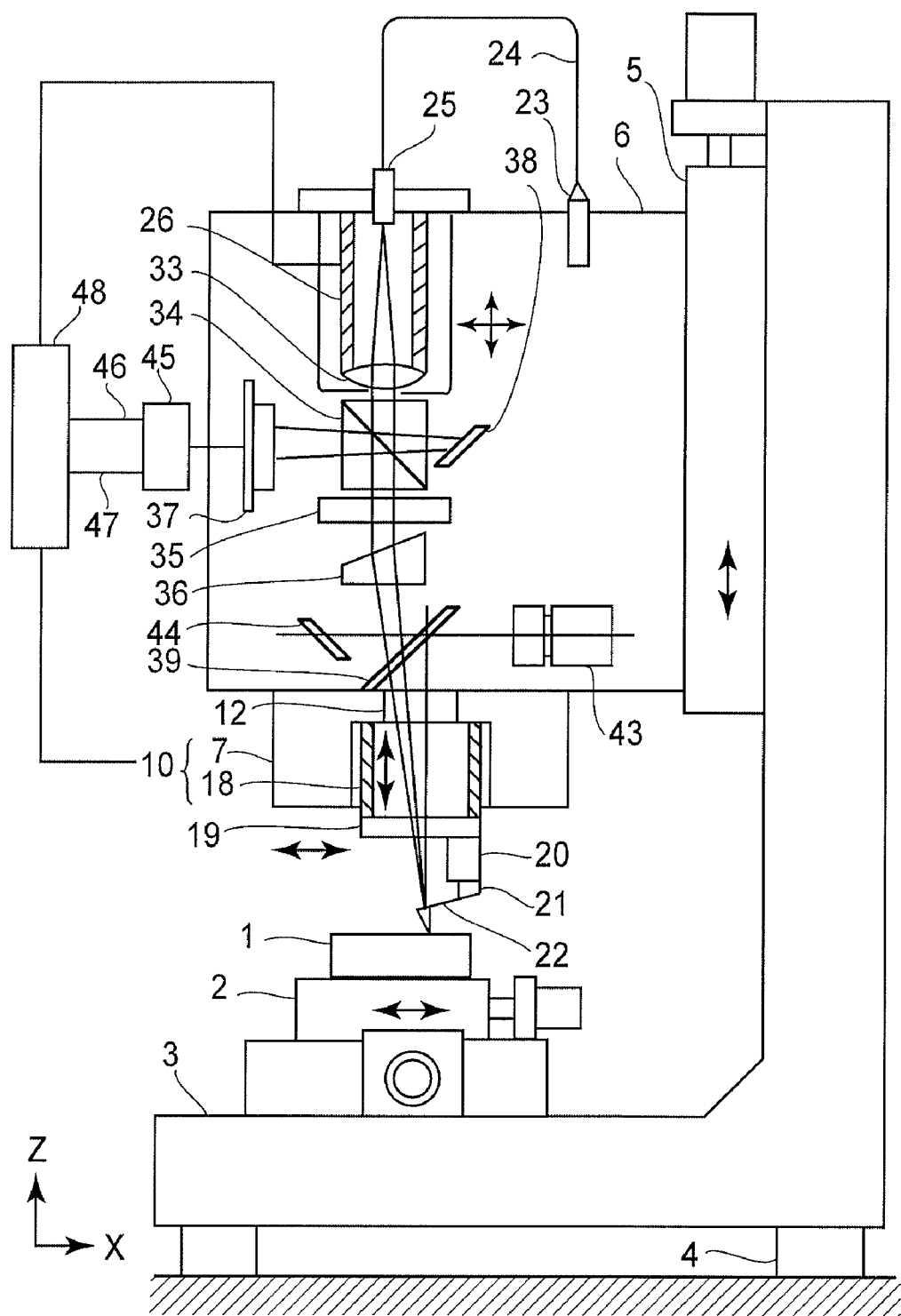

FIG. 15 illustrates an atomic force microscope according to Embodiment 4. The atomic force microscope of this embodiment has the same constitution as that of the atomic force microscope according to Embodiment 1 except that the lens 33 is fixed to the end of the second scanner 26.

The emission end 25 of the optical fiber is fixedly provided to the housing 6 and the second scanner 26 is fixedly provided to the optical fiber emission end 25 at an upper end thereof. At a lower end of the second scanner 26, the lens 33 is fixedly provided.

In the constitution of this embodiment, by the operation of the second scanner 26, it is possible to move X, Y and Z positions of the lens 33. When the lens 33 is moved in a direction perpendicular to the optical axis direction, the focus position is also moved in the direction perpendicular to the optical axis direction. Further, when the lens 33 is moved in the optical axis direction, the focus position is also moved in the optical axis direction. Accordingly, the X, Y and Z positions of the focus position can be controlled by the second scanner 26.

Embodiment 5

Figure 16:
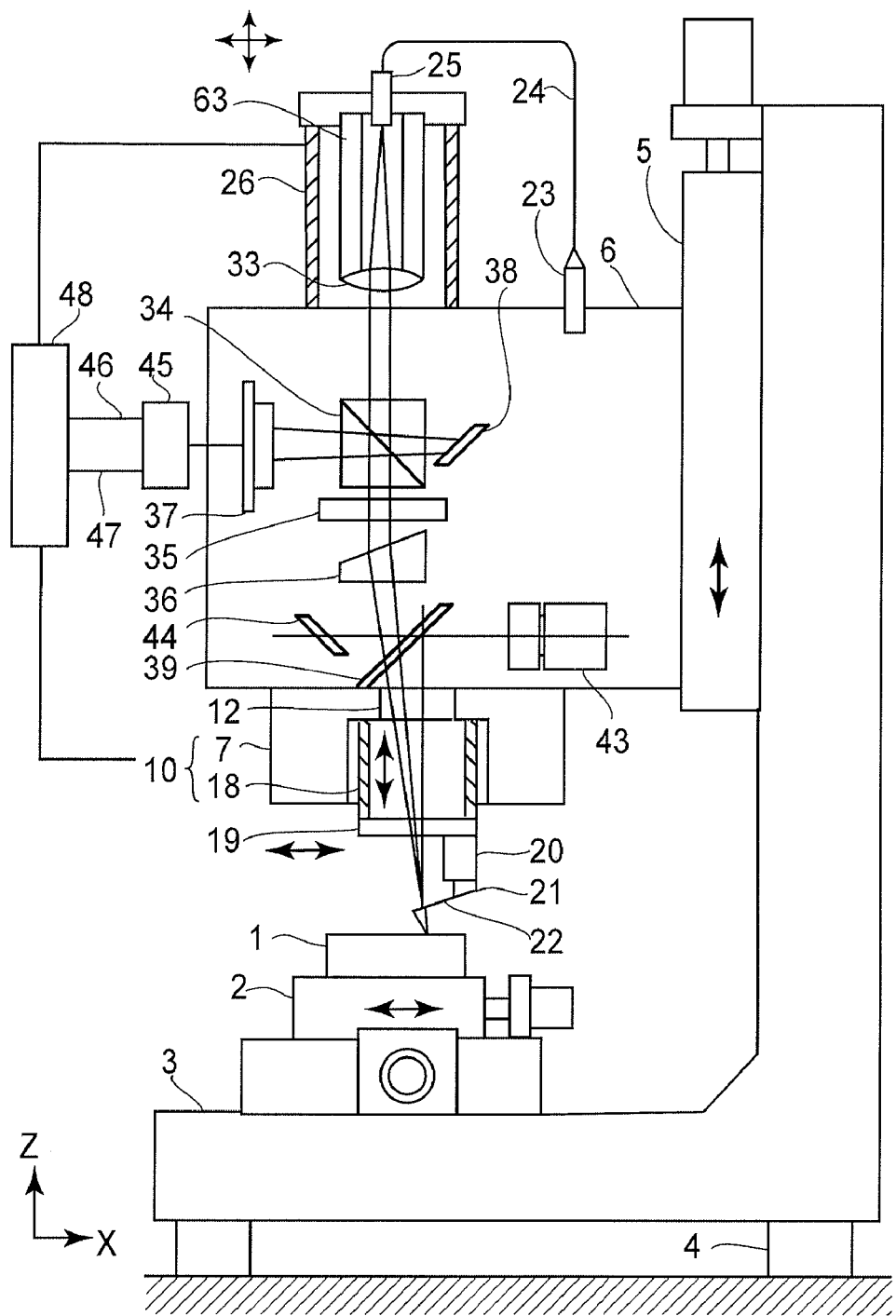

FIG. 16 illustrates an atomic force microscope according to Embodiment 5. The atomic force microscope of this embodiment has the same constitution as that of the atomic force microscope according to Embodiment 1 except that the optical fiber emission end 25 and the lens 33 are fixed to a member provided at an upper end of the second scanner 26.

The second scanner 26 is fixedly provided to the housing 6 at a lower end thereof. At the upper end of the second scanner 26, a body tube member 63 is fixed. At both ends of the body tube member 63, the optical fiber emission end 25 and the lens 33 are fixedly provided, respectively.

In the constitution of this embodiment, by the operation of the second scanner 26, it is possible to move the X, Y and Z positions of the lens 33 and the optical fiber emission end 25 as the point source of light at the same time. As a result, it is possible to control the X, Y and Z positions of the focus by the second scanner 26.

Embodiment 6

Figure 17:
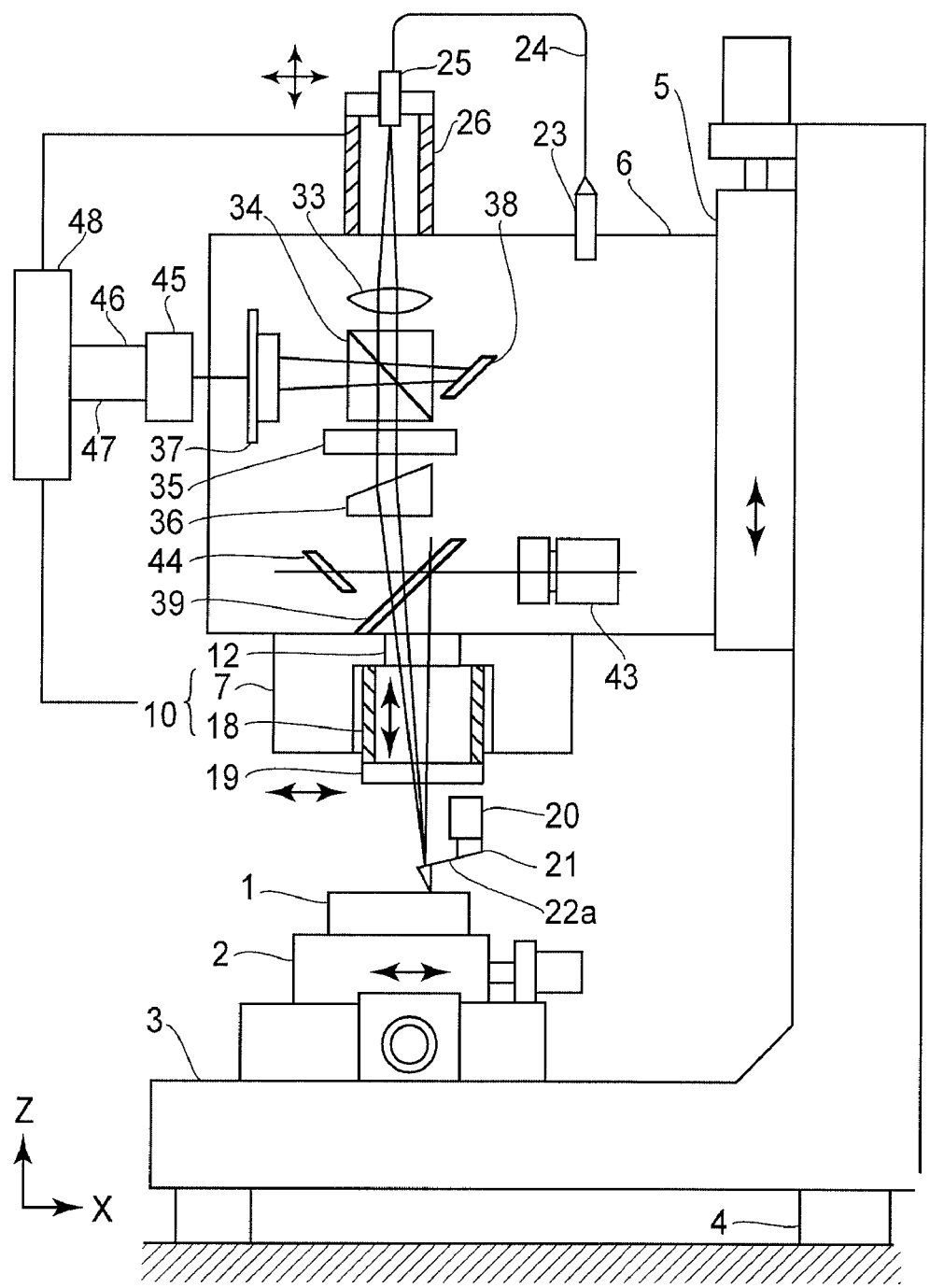

FIGS. 17 to 23 illustrate Embodiment 6, wherein FIG. 17 shows an atomic force microscope according to this embodiment. The atomic force microscope of this embodiment has the same constitution as that of the atomic force microscope according to Embodiment 1 except that the (single) probe 22 is changed to a probe assembly including a plurality of probes 22a to 22c. In this embodiment, three probes are used but the number thereof is not limited.

Each of the three probes 22a, 22b and 22c has a beam-like structure having a very small thickness of several microns or below and a width of several tens of microns in order to measure a very small force. These probes are ordinarily prepared as a probe assembly having an integral structure using photolithography.

The scanner control apparatus 48 is constituted by a computer capable of effecting high-speed processing and a driver amplifier for driving (operating) the respective scanners 10 and 26 and is capable of operating a plurality of control programs in a multitask manner.

Figure 18:
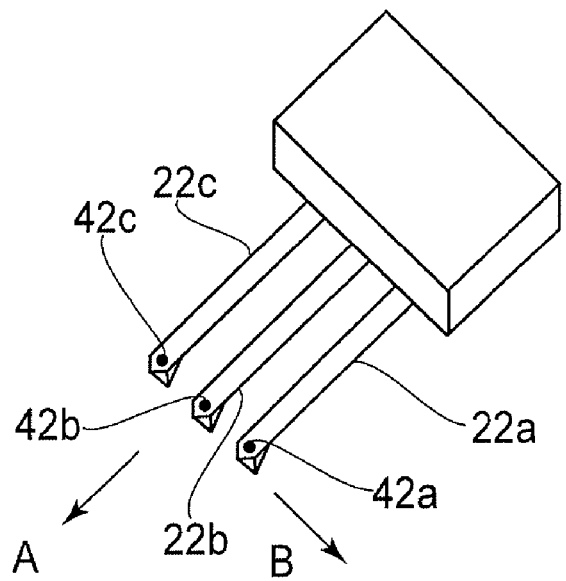
FIG. 18 is a perspective view showing a probe assembly of an apparatus used in Embodiment 6.

FIG. 18 shows the probe assembly including the plurality of probes 22a to 22c (three probes in this embodiment). As described above, the number of the probes is not limited to three.

Independently of the probe assembly moved by the first scanner 10, it is possible to move the focus position of the "optical lever" optical system to a desired position by the second scanner 26. For this reason, a timing signal for successively repeating three states corresponding to the three probes 22a to 22c is generated and the focus position is controlled by the timing signal. As a result, the focus 40 is successively placed on optimum positions 42a, 42b and 42c of the probes 22a, 22b and 22c, respectively.

At this time, the light ray reflected from the respective probes 22a to 22c enter the light detection means 37 and provide a single output signal. For this reason, in this embodiment, the output signal of the light detection means 37 is divided into output signals corresponding to the respective probes 22a to 22c in synchronism with the above described timing signal by means of a sample-and0hold device for holding the output signal of the light detection means 37.

When a switching speed of the timing signal is sufficiently high, it is possible to apparently realize the same function as a combination of a plurality of light sources, optical systems, and light detection means in correspondence with the plurality of probes. In other words, it is possible to measure bending of each of the probes and permit simultaneous measurement at several points, i.e., multiprobing.

Independently of the probe assembly moved by the first scanner 10, by moving the focus position of the "optical lever" optical system by means of the second scanner 26, it is possible to place the focus on the optimum positions 42a, 42b and 42c of the probes 22a, 22b and 22c, respectively.

Figure 19:
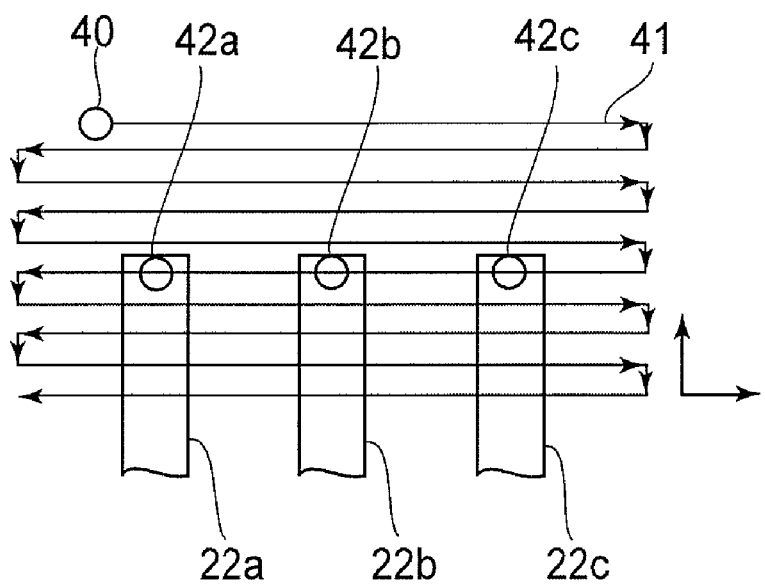
FIG. 19 is a schematic view for illustrating a relationship between a focus of an optical system and the probe assembly in the apparatus used in Embodiment 6.

FIG. 19 is a schematic view of the three probes 22a to 22c as seen from above. When the focus is subjected to scanning with the second scanner 26 along a meander scanning trace, the light amount of the light detection means 37 is increased when the focus 40 coincides with any one of the probes. In such a state, a light amount map having an abscissa representing a position of the second scanner 26 and an ordinate representing a light amount signal is created by measurement.

Figure 20:
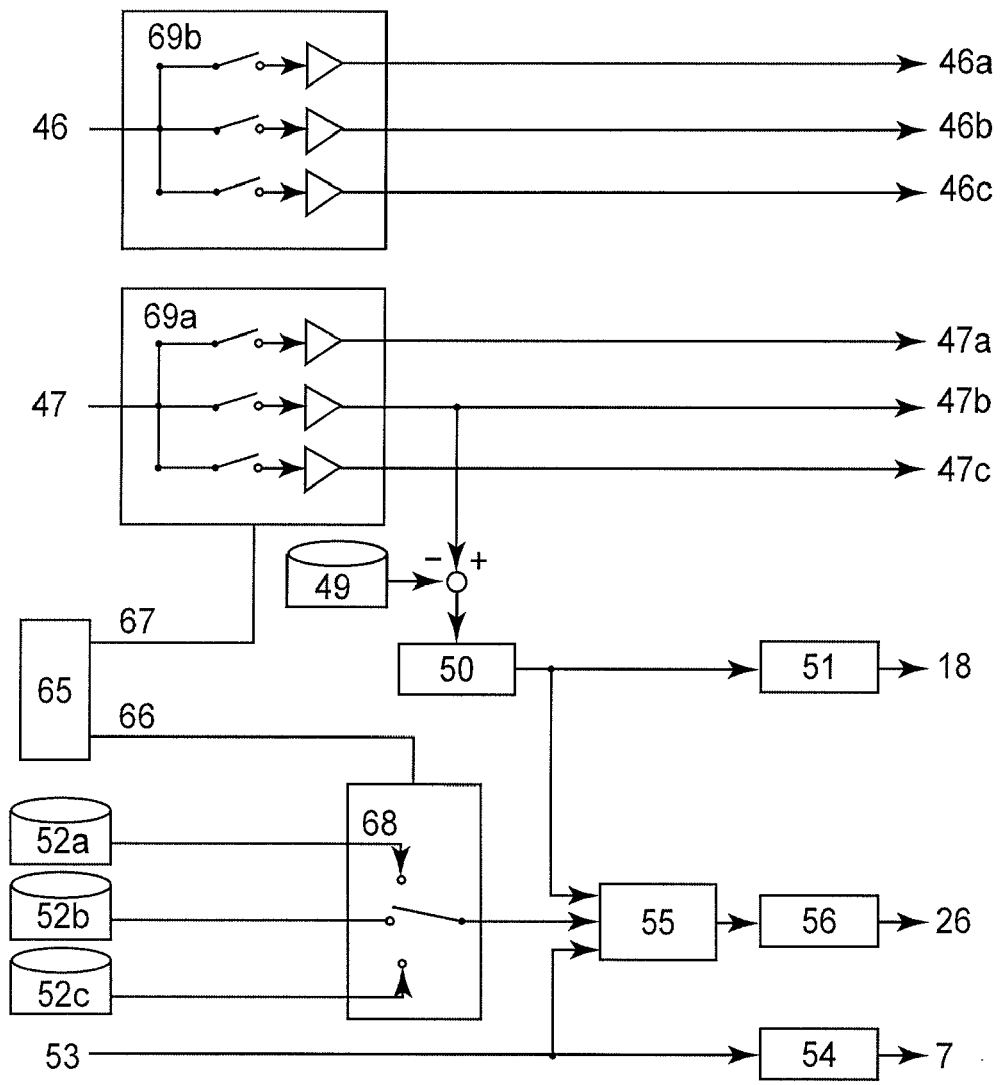
FIG. 20 is a block diagram showing a constitution of a scanner control apparatus of the apparatus used.

FIG. 20 shows a control block diagram for realizing multiprobing. This control can be realized by the scanner control apparatus 48. A timing signal generation apparatus 65 generates two timing signals, with different times, including a multiplexer timing signal 66 and a sample timing signal 67.

Figure 21:
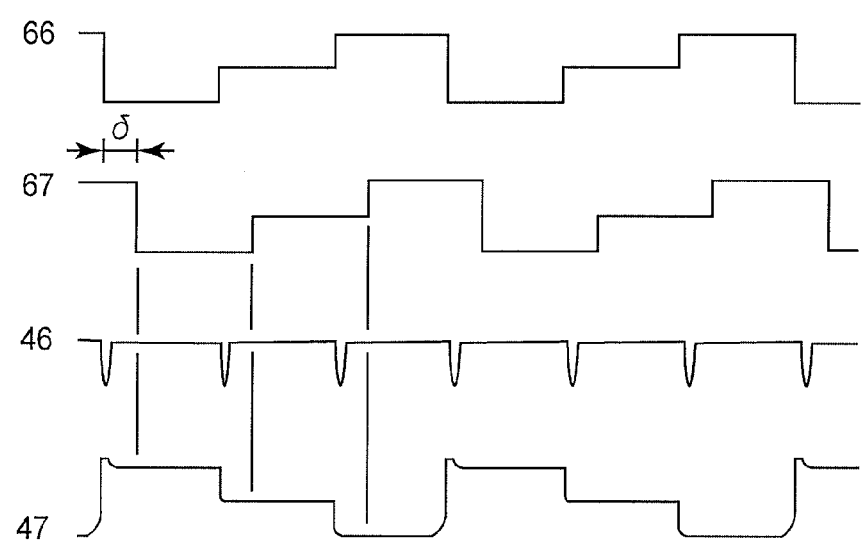
FIG. 21 shows time charts in multi-probing by the apparatus used in Embodiment 6.

FIG. 21 is a time chart for the control. Referring to FIG. 21, the multiplexer timing signal 66 is a signal for periodically repeating three states corresponding to the three probes 22a to 22c and is sent to a multiplexer apparatus 68. The multiplexer apparatus 68 selects and outputs one of inputted signals and the selected inputted signal can be controlled by the multiplexer timing signal 66. To inputs of the multiplexer apparatus 68, three position conversion data 52a, 52b and 52c are connected. One of output data is sent to a position converter 55. The three position conversion data 52a, 52b and 52c corresponds to the optimum positions 42a, 42b and 42c of the probes 22a, 22b and 22c, respectively.

The optimum positions 42a, 42b and 42c and the corresponding position conversion data 52a, 52b and 52c are preliminarily measured and obtained as described later.

The position converter 55 is connected to a second scanner driver amplifier 56 and further connected to the second scanner 26.

As a result, the focus 40 is moved, by the second scanner 26, to the optimum positions 42a, 42b and 42c successively selected by the multiplexer timing signal 66.

Even when the probe assembly is moved by the first scanner 10, the second scanner 26 is moved synchronously to cause the focus 40 to follow the optimum position of the selected probe. As a result, as shown in the time chart shown in FIG. 21, the light amount signal 46 and the light position signal 47 are outputted at the time when the focus is placed on each of the probes 22a to 22c.

On the other hand, the sample timing signal 67 is a signal delayed by a small waiting time δ from the multiplexer timing signal 66 and is sent to two sample-and-hold devices 69a and 69b.

Each of the sample-and-hold devices 69a and 69b effects a sample-and-hold operation in which sampling is effected by dividing an input signal into three signals and the sampled signal is held until subsequent sampling and then is outputted. The operation timing can be controlled by the sample timing signal 67.

The waiting time δ corresponds to a delay of time from movement of the second scanner 26 is correspondence with the multiplexer timing signal 66 to cause the light reflected by the probe to enter the light detection means 37 to output of the light amount signal 46 and the light position signal 47. As shown in the time chart of FIG. 21, the light position signal 47 starts a change at a timing of the multiplexer timing signal 66 and at the time when the waiting time δ has elapsed to stabilize the signal, the sample-and-hold operation is performed by the sample timing signal 67.

When a switching speed of the timing signal generation apparatus 65 is sufficiently high, it is possible to apparently realize the same function as a combination of a plurality of light sources, optical systems, and light detection means in correspondence with the plurality of probes 22a to 22c. In other words, according to this embodiment, it is possible to measure bending of each of the probes 22a to 22c and permit simultaneous measurement at several points, i.e., multiprobing.

The light position signal 47 is inputted into the sample-and-hold device 69a and is divided into three light position signals 47a, 47b and 47c corresponding to the three probes 22a, 22b and 22c, respectively.

The light amount signal 46 is inputted into the sample-and-hold device 69b and is divided into three light amount signals 46a, 46b and 46c corresponding to the three probes 22a, 22b and 22c, respectively.

First, a feedback control system of bending of the probe will be described. As described above, the bending of the probe is caused by the force acting between the member 1 to be measured and the probe 22, i.e., the atomic force. For this reason, the light position signal 47 of the light detection means 37 represents the atomic force. A target atomic force is determined in advance and a light position target value 49 of corresponding to the target atomic force is determined. Then, one of the three (divided) light position signals is selected. In this embodiment, description will be made by selecting the light position signal 47b corresponding to the central probe 22b as an example. Even when other probes are selected, a similar result is achieved.

From the selected light position signal 47b, the light position target value 49 is subtracted and fed back to the Z fine movement axis 18 through a control system including a Z fine movement axis compensator 50 and a Z fine movement axis driver amplifier 51. The Z fine movement axis compensator 50 is required for keeping stably the feedback control system. For example, PID control is known.

As described above, when one signal is selected, the same control as in the case of the single probe is effected.

By this control system, the Z fine movement axis 18 of the first scanner 10 is separated so as to cancel a change in light position signal 47b. The light position signal 47b represents the atomic force and the Z fine movement axis 18 changes a relative distance between the probe 22b and the member 1 to be measured. More specifically, by performing the feedback control, it is possible to measure information on a height at which the atomic force is a constant value. This measurement is performed by the null-balance method (zero method).

By the control according to the null-balance method, the Z axis of the first scanner 10 is vertically moved along projections and recesses of the member 1 to be measured. When the vertical movement is large, the probe is largely moved in the optical axis direction of the "optical lever". As a result, the focus is not formed on the probe, thus resulting in a large problem in a conventional method. According to this embodiment, it is possible to adjust the position of the focus in the optical axis direction in accordance with displacement of Z axis of the first scanner 10, so that the problem in the conventional method has been solved.

A target position 53 of XY scanning for scanning the entire measuring range of the member 1 to be measured is created and the XY scanner 7 is driven via the XY scanner driver amplifier 54.

Further, the position conversion data 52a, 52b and 52c corresponding to the three probes 22a, 22b and 22c are preliminarily prepared. Each of the position conversion data represents a position relationship between the X, Y and Z positions of the first scanner 10 having the Z fine movement axis 18 and corresponding positions of the second scanner 26. By satisfying the position relationship, the focus position of the "optical lever" optical system coincides with the position of the probe. A preparation method of the position conversion data 52a, 52b and 52c will be described later.

One of the three position conversion data 52a, 52b and 52c is selected in synchronism with the timing signal 66 by using the multiplexer 68.

The selected position conversion data 52b and the position of the first substrate 10, i.e., an output of the compensator 50 and the target position of the XY scanning are inputted into a position converter 55 and a resultant output is inputted into the scanner driver amplifier 56 to drive the second scanner 26.

After one probe is selected by the multiplexer 68, the position conversion data 52b and the operation of the position converter 55 are identical to those in Embodiment 1, thus being omitted from the following description.

Figure 22:
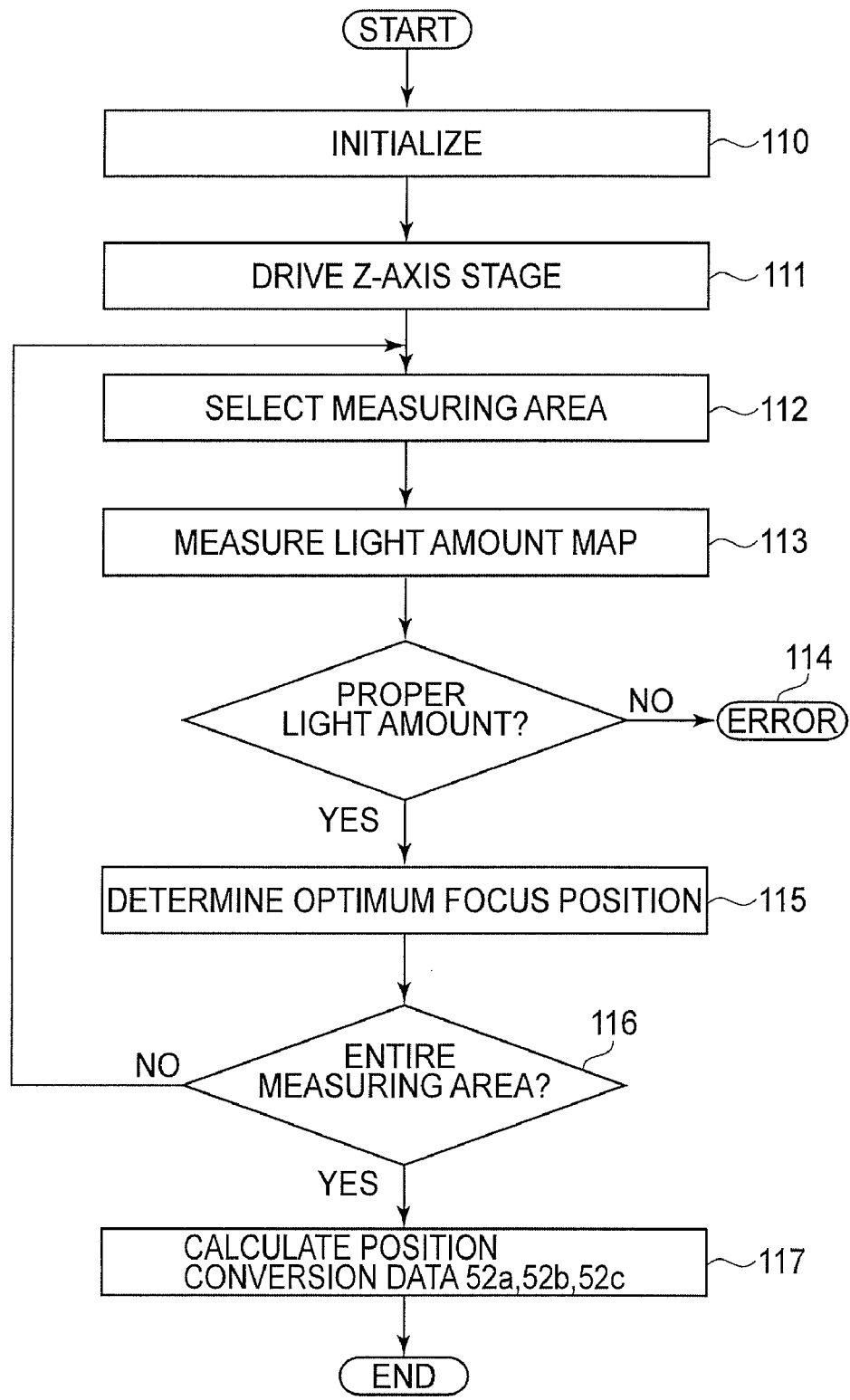
FIG. 22 is a flow chart showing steps for obtaining position conversion data of the apparatus used in Embodiment 6.

FIG. 22 is a flow chart for obtaining the position conversion data 52a to 52c for the atomic force microscope of this embodiment.

First, the position conversion data 52a to 52c are initialized, respectively in step 110. It can be considered that the second scanner 26 cannot be actuated at all when an abnormal value is set as each of the position conversion data 52a to 52c. For this reason, each of the position conversion data 52a to 52c is first initialized. As the initial value, it is possible to use a simple model represented by the above described formula (2). At this stage, it is not necessary that each of the position conversion data 52a to 52c is accurate, so that the theoretical study result represented by the formula (2) is sufficient.

In step 111, the Z(-axis) coarse movement stage 5 is moved upward, so that the member 1 to be measured is separated from the probe assembly. In step 112, a position of the first scanner 10 is selected from a measuring area. The measuring area is divided into an finite number of lattices. Each of lattice points is successively selected and the first scanner 10 is moved to a position of the selected lattice point. In step 113, the optical system is subjected to scanning with the second scanner 26 to measure and obtain a map of the light amount signals 46a to 46c.

In step 114, it is confirmed that the light amount is in a normal range. When the light amount is in an abnormal range, the procedure is terminated due to error. In the case where the entire light amount map has an insufficient light amount, error termination is effected since it is considered that alignment of the "optical lever" optical system is largely deviated or that the probe assembly is detached from the fixed portion. In step 115, an optimum position on which the focus is placed is determined from the light amount map. It is possible to read the position and the shape of the probes 22a to 22c from the light amount map, so that it is possible to obtain the optimum positions 42a to 42c at which the focus 40 is optimally placed on the reflected surfaces of the probes 22a to 22c as shown in FIG. 19.

In step 116, when the entire measuring area is not covered completely, the first scanner is moved to a next position and the procedure is returned to step 112.

By this loop, a position of the second scanner 26 corresponding to a position of the first scanner 10 in order to realize the optimum focus position in the finite number of lattice points is obtained. This is sets of pairs of inputs and outputs, i.e., X position and Y position, represented by the above described formula (2).

In step 117, the position conversion data 52a to 52c are calculated. More specifically, by using the sets of pairs of inputs and outputs represented by formula (2), each of coefficients is calculated according to the method of least squares. The formula (2) is a model for the polynomial, so that when residual error is large, accuracy can be improved by increasing the degree of the polynomial. The thus obtained coefficients are the position conversion data 52a to 52c.

Figure 23:
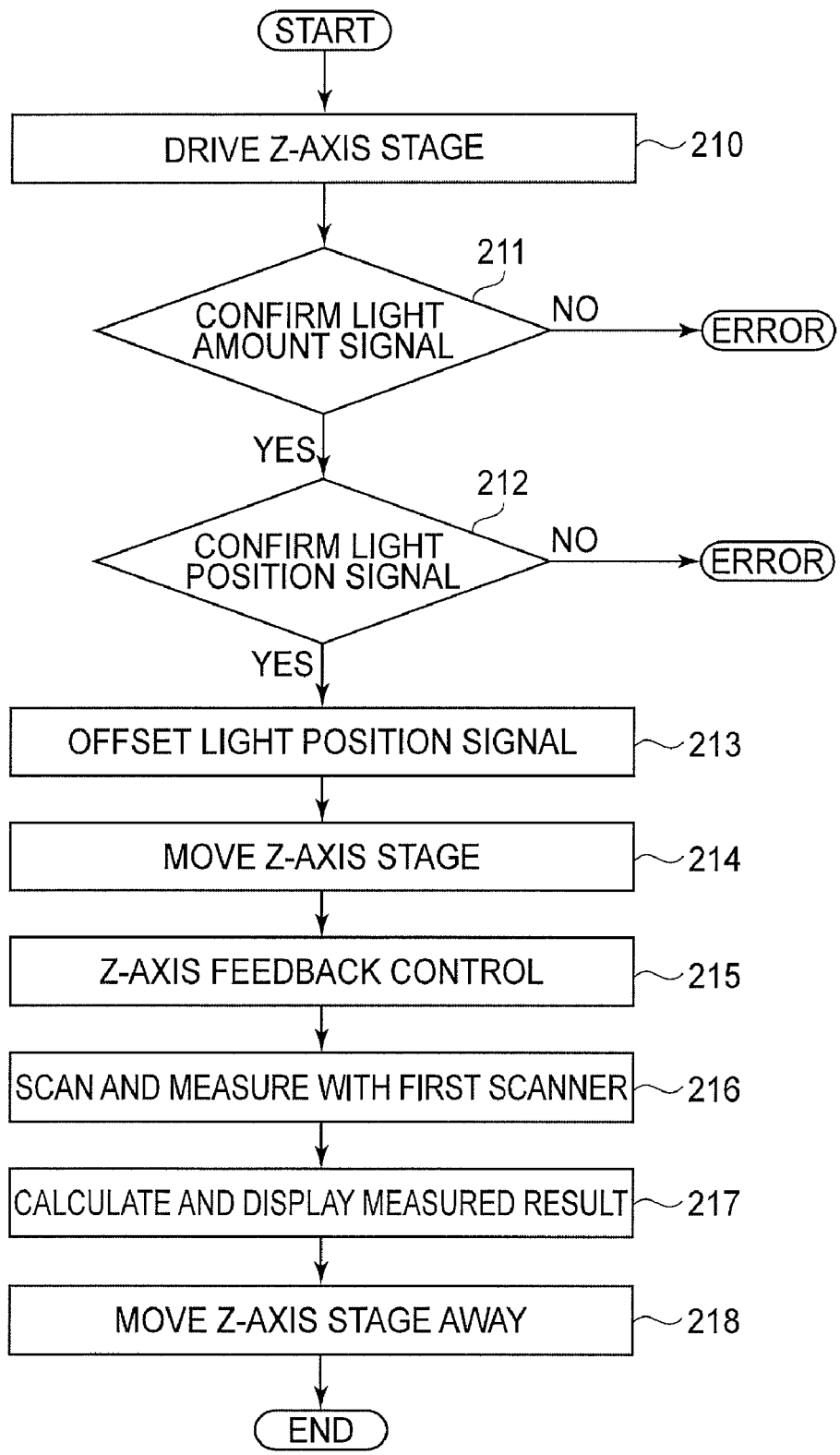
FIG. 23 is a flow chart showing a measuring operation of the apparatus used in Embodiment 6.
Figure 24:
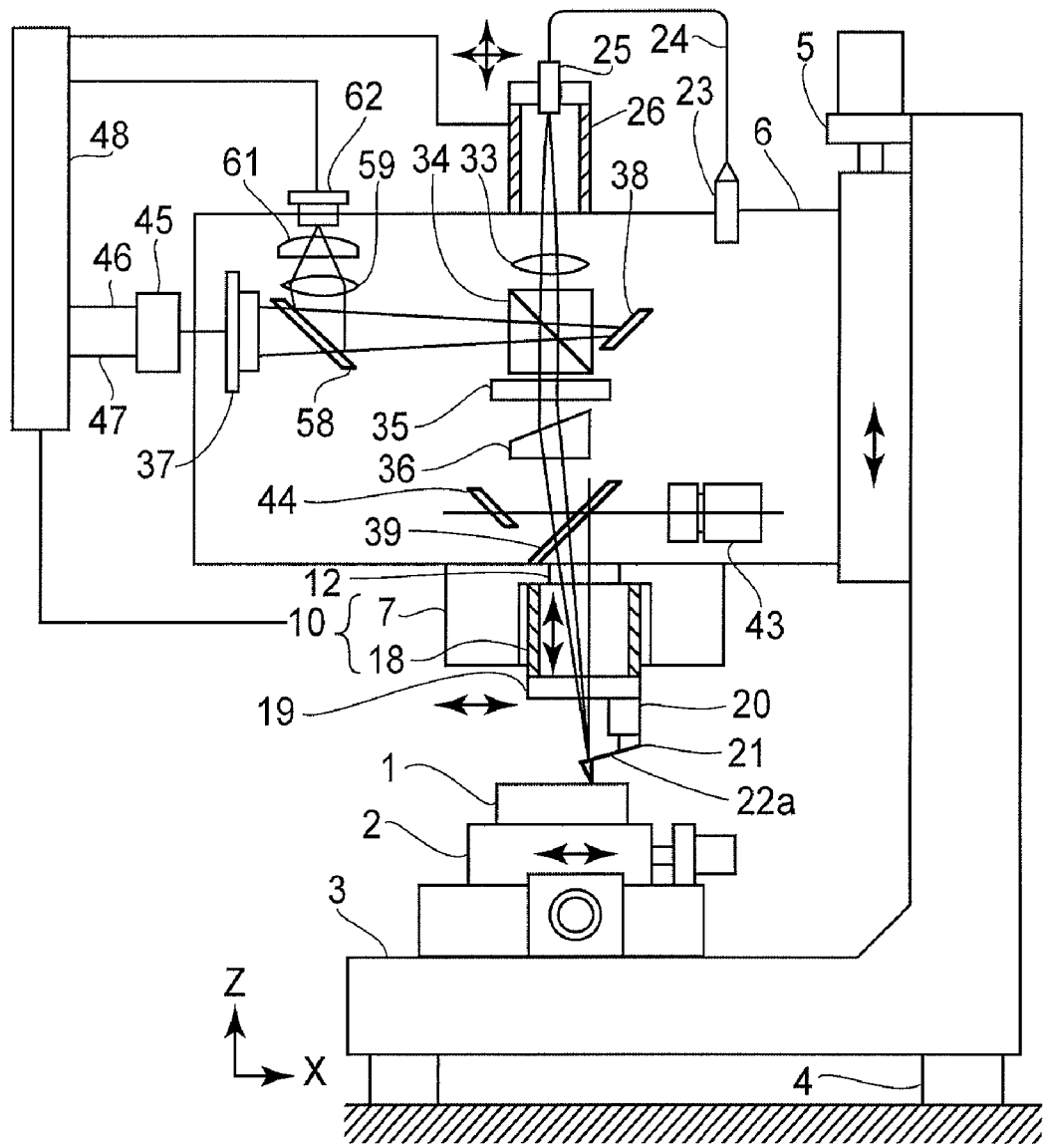
FIGS. 24 and 25 are schematic views for illustrating Embodiments 7 and 8, respectively.
Figure 25:
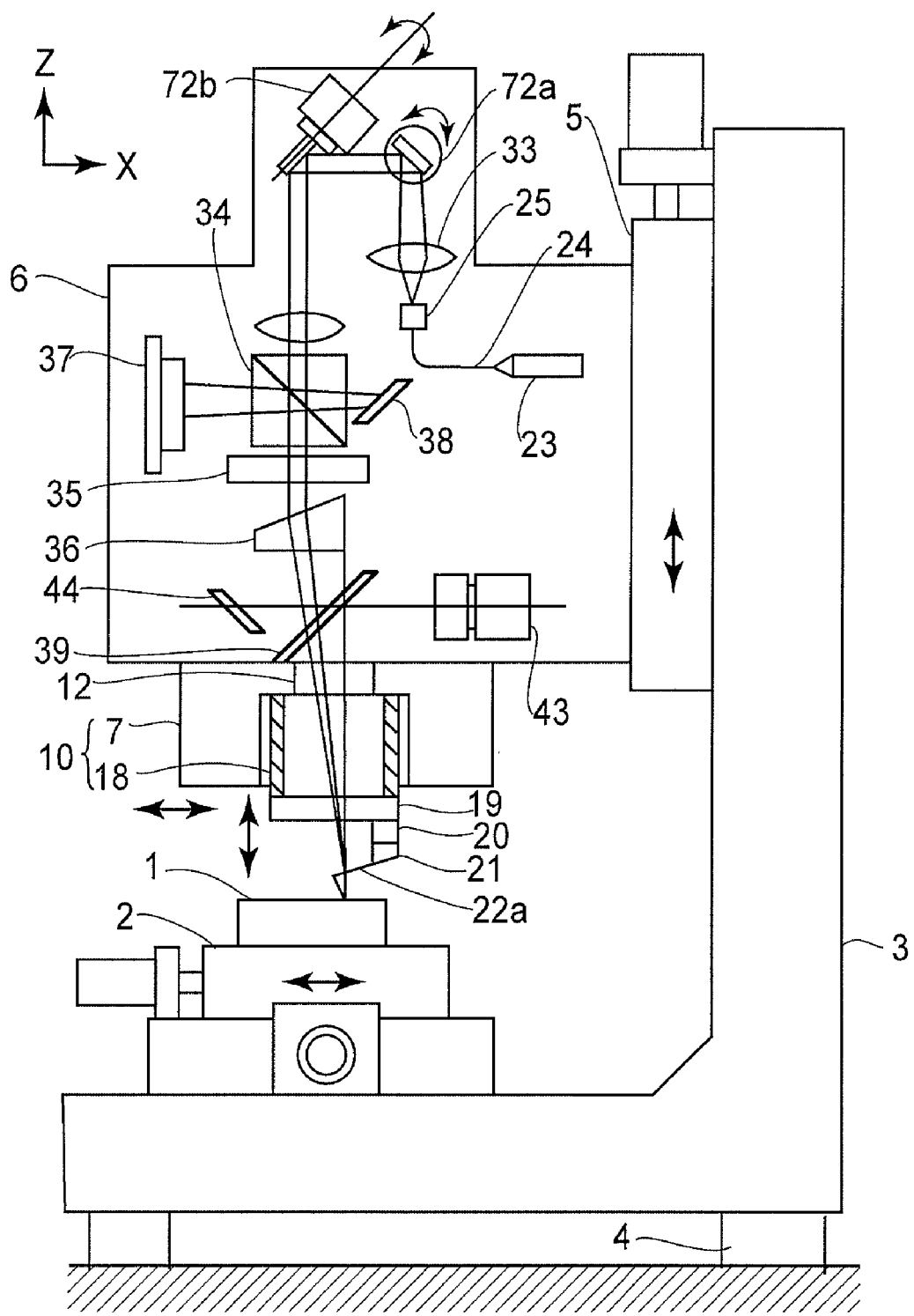
Figure 26:
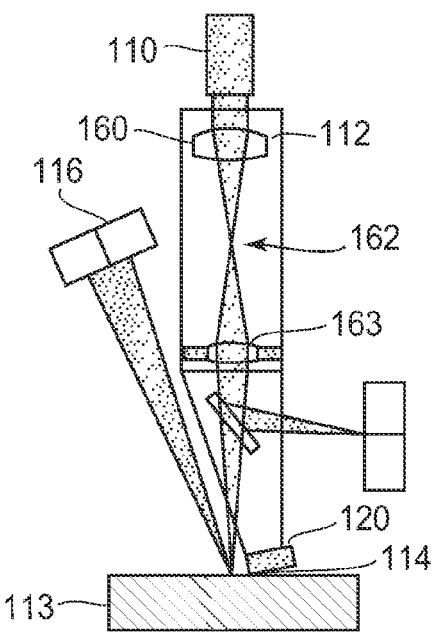
FIGS. 26 and 27 are schematic views each for illustrating a conventional embodiment.
Figure 27:
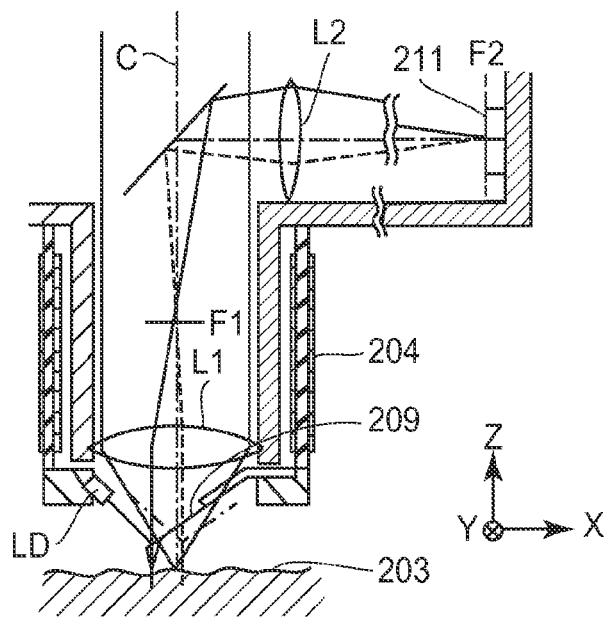

FIG. 23 shows a flow chart of an entire measuring operation of the atomic force microscope.

First, in step 210, the 8 coarse movement stage 5 is moved upward and the member 1 to be measured is set to the XY coarse movement stage 2. In step 211, it is confirmed that the light amount signal 46 of the light detection means 37 is in a normal range. When the light amount signal 46 is in an abnormal range, the procedure is terminated due to error. For example, in the case where the light amount is insufficient, error termination is effected since it is considered that initial setting error such that alignment of the "optical lever" optical system is deviated or that the probe assembly is detached from the fixed portion is caused to occur. Further, in the former case (alignment deviation), by setting the position conversion data 52a to 52c again in accordance with the above described procedure, it is possible to effect measurement again.

In step 212, it is confirmed that the light position signal 47 of the light detection means 37 is in a normal range. When the light position signal 47 is in an abnormal range, error termination is effected. The light position signal 47 represents bending of the probes 22a to 22c enlarged by the action of the "optical lever". In the case where the light position signal 47 is abnormally larger than a preliminarily determined threshold, error termination is effected since it is considered that the probes 22a to 22c are largely bent originally.

In step 213, offset of the light position signal 47 of the light detection means 37 is set so that an output is zero. In a state in which the probe assembly and the member 1 to be measured are apart from each other, the offset of the light position signal 47 is effected in order to cancel minute alignment error of the "optical lever" optical system and offset error of an electrical system. In step 214, the Z coarse movement stage 5 is moved until the light position signal 47 reaches a preliminarily set value. The light position signal 47, as described above, represents the bending of each of the probes 22a to 22c enlarged by the action of the "optical lever", i.e., a force acting between each of the probes 22a to 22c and the member 1 to be measured. The Z coarse movement stage 5 is moved upward and downward until the force reaches the preliminarily set value. As a result, the probe assembly is brought very close to the member 1, so that an influence of atomic force is shown.

In step 215, feedback control is effected with respect to the Z fine movement axis 18 so that an output of the light position signal 47 is constant. By this feedback control, as described above, it is possible to perform measurement according to the null-balance method. When the feedback control is effected, the force acting between each of the probes 22a to 22c and the member 1 to be measured is constant, so that the Z coarse movement stage 5 is moved upward and downward depending on projections and recesses of the member 1.

In step 216, scanning with the first scanner 10 is effected in the measuring range. In the measuring range, scanning with the probe assembly is effected to record the light position signal 47 and the position of the Z fine movement axis 18 in the entire measuring range. At that time, as described above with reference to the block diagram shown in FIG. 20, the position of the second scanner 26 is controlled in correspondence with the position of the first scanner 10, i.e., the positions of the Z fine movement axis 18 and the XY scanner 7, by using the position conversion data 52a to 52c. By this control, the focus 40 of the "optical lever" optical system always follows the surfaces of the probes 22a to 22c. Further, the position conversion data 52a to 52c are switched by the timing signal 66, so that the focus is successively moved on the respective probes 22a to 22c.

In step 217, a measurement result is calculated displayed, and stored. The measurement result is shown in a graph having an abscissa representing XY position of the first scanner 10 and an ordinate representing a position of the Z fine movement axis 18.

With respect to the Z fine movement axis 18, feedback control is effected so that the light position signal 47 representing the force exerted between each of the probes 22a to 22c and the member 1, i.e., atomic force is constant. Accordingly, the measurement result represents a map of projections and recesses of the member 1 providing a constant atomic force.

In the feedback control, control error (system deviation) occurs even when a degree of the control error is slight. Even when there is the control error, it is possible to make correction by adding a value obtained by converting an output of the light position signal 47 into displacement in Z direction to a measured value. A conversion ratio at this time is a ratio between an amount of movement of the member 1 to be measured and an amount of movement of the light position signal 47. This ratio can be measured by gradually pushing the probes 22a to 22c into the member 1. Further, it is also possible to calculate the ratio by using a computational model of atomic force.

In step 218, the Z coarse movement stage 5 is moved upward and the member 1 to be measured is detached from the XY coarse movement stage 2.

According to this embodiment, it is possible to place the focus on each of the probes 22a to 22c by adjusting the focus position in correspondence with the position of the first scanner 10 by means of the second scanner 26. Further, the focus position can be adjusted three dimensionally, so that it is possible to prevent deviation in the optical axis direction.

By monitoring the light amount of the light detection means 37 with the second scanner 26, it is possible to detect the optimum focus positions. A table of the optimum focus positions is prepared and used to control the position of the second screen 26 is correspondence with the position of the first scanner 10. As a result, the focus position can be always held at the optimum position of each of the probes.

With respect to alignment adjustment during replacement of each probe, according to this embodiment, an operation or judgement by an operator is not required for detection of the focus position and adjustment of the focus position, so that the alignment adjustment can be simply performed automatically.

Incidentally, referring again to FIG. 18, by effecting scanning with the probe assembly in a direction of an indicated arrow A, it is possible to measure three points at the same time by the three probes 22a to 22c, so that a total measuring time can be reduced to ⅓ of that in the case of using the single probe. Further, by measuring four or more points at the same time, the total measuring time can be further reduced. When the scanning with the probe assembly is effected in a direction of an indicated arrow B, it is possible to obtain a result of simultaneously measurement at three points on the same line. By applying a technique which is called three-point method" to the measurement result, it is possible to cancel motion error generated during the scanning. As a result, measurement accuracy is further improved.

As described above, independently of the first scanner 10, it is possible to successively place the focus on the three probes 22a, 22b and 22c by moving the focus of the "optical lever" optical system with the second scanner 26. Further, from the output signals of the light detection means 37 and the position of the first scanner 10, by calculating measurement values corresponding to the respective probes 22a, 22b and 22c, it is possible to perform simultaneous measurement at several points, i.e., multiprobing.

An effect of the multiprobing will be described more specifically.

As described above, when the scanning with the probe assembly is effected in the direction of the arrow A, different three points are measured at the same time, so that the total measuring time is reduced to ⅓. Further, when the scanning with the probe assembly is effected in the direction of the arrow B, it is possible to obtain the result of simultaneous measurement at three points on the same line. By applying the "three-point method" to the measurement result, motion error generated during the scanning can be cancelled.

The three-point method will be briefly described.

When a position in a measuring direction is taken as x, three measured values are taken as $z_1(x)$, $z_2(x)$ and $z_3(x)$, and a distance between adjacent probes is taken as δ, a difference formula g (x) representing second order differential is represented by the following formula (5):

$$g(x) = \frac{z_1(x) + z_3(x) - 2z_2(x)}{\delta^2} \quad (5)$$

The formula (5) shows that an influence of motion error of the probe assembly is cancelled. For example, when there is a vertical motion error, the same offset is added to the three measured values $z_1(x)$, $z_2(x)$ and $z_3(x)$ but the value g (x) is not affected based on the above formula (5).

When the above formula (5) is subjected to integration two times, it is possible to obtain a shape. The thus calculated measurement result cancels the motion error of the probe assembly.

According to this embodiment, in addition to the effect achieved by Embodiment 1, the following problem can also been solved.

In the conventional technique, it has been difficult to be compatible with the multiprobing. However, in this embodiment, it is possible to measure each of bendings of the plurality of probes by moving the focus at high speed using the second scanner, so that it is possible to effect simultaneous measurement at several points, i.e., multiprobing. Further, by the multiprobing, multipoint simultaneous measurement can be performed, so that the total measuring time can be reduced. Further, by effecting the multiprobing using the three-point method, the measurement accuracy is further improved.

Incidentally, the timing signal 66 shown in FIG. 21 is selected so that the three probes are simply repeated. However, a similar effect can be obtained even when the order of selection of the three probes 22a, 22b and 22c is changed. For example, when the selection of the probes is repeated in the order of 22a, 22b, 22c and 22b and 22a, it is possible to obtain a sampling frequency, of the central probe 22b, two times larger than those of other probes 22a and 22c.

Embodiment 7

FIG. 11 illustrates an atomic force microscope according to Embodiment 7. The atomic force microscope of this embodiment has the same constitution as that of the atomic force microscope of Embodiment 6 except that an auto focus apparatus is incorporated in the optical system of the apparatus of Embodiment 6.

The auto focus apparatus is fixed to the housing and includes a half mirror 58, a lens 59, a cylindrical lens 61, and a four-piece photodiode 62.

Light reflected by each of the probes 22a to 22c is diffusive light since focus thereof is placed on the reflection surface of the probe. The light is reflected by the beam splitter 34 and enters the half mirror 58. The transmitted light enters the light detection means 37 and the reflected light is converted into light converged by the lens 59 and passes through the cylindrical lens 61 to enter the four-piece photodiode 62.

The auto focus apparatus utilizing astigmatism described above introduces therein light branched by the half mirror disposed in the optical path of the light reflected by the reflection surface of the probe. In addition to the light amount map, by using an output of the auto focus apparatus, a position of the probe is calculated. Also in the optical axis direction, the light reflected by the probe diffuses, so that the amount of light entering the light detection means is decreased. For this reason, similarly as in the case of the direction perpendicular to the optical axis, an optimum position can be searched while detecting the light amount. However, the NA of the "optical lever" optical system is small, so that the optical system is less sensitive to deviation in the optical axis direction, i.e., has a large depth of focus. Accordingly, the deviation in the optical axis direction detectable by the light amount of the light detection means is low in sensitivity.

In this embodiment, the light reflected by the probe is branched by the half mirror and deviation thereof in the optical axis direction is detected by the auto focus apparatus. The auto focus apparatus has known some types but the auto focus apparatus utilizing the astigmatism has been widely used as described above.

By using the auto focus apparatus, the measurement accuracy can be improved even with respect to the deviation in the optical axis direction, so that it is possible to cause the focus position to accurately coincide with the probe position. As a result, the measurement accuracy can be further improved. In addition, it is also possible to obtain the position conversion data in all the directions with high accuracy by measuring the deviation in the optical axis direction using the auto focus apparatus and measuring the deviation in the direction perpendicular to the optical axis direction using the light amount of the light detection means.

As described above, in the case where the measurement according to the null-balance method in which the feedback control is effected with respect to the Z fine movement axis so that the bending of the probe, i.e., the force acting between the probe and the member to be measured is constant, the z fine movement axis and the probe are moved upward and downward depending on projections and recesses of the surface of the member to be measured. By this upward and downward movement of the probe, the focus position of the "optical lever" optical system is also deviated in the optical axis direction. However, in this embodiment, it is possible to obtain the position conversion data also in the optical axis direction with high accuracy, so that it is possible to correct the deviation in the optical axis direction with high accuracy. Particularly, a roughened surface is subjected to measurement, displacement of the Z fine movement axis is large. For this reason, the technique of this embodiment is very important.

Embodiment 8

FIG. 35 illustrates an atomic force microscope according to Embodiment 8. The atomic force microscope of this embodiment has the same constitution as that of the atomic force microscope according to Embodiment 6 except that galvano-mirrors 71 and 72 are incorporated therein in an optical path of reflected light from each of the probes 22a to 22c.

The galvano-mirror has been widely used as a light polarizing device capable of controlling an angle of a mirror at high speed by utilizing electromagnetic force etc. It is also possible to control the direction of light in two directions by combining two galvano-mirrors each capable of controlling one angle of rotation. Further, by disposing a planar galvano-mirror using a torsion bar in the optical system, the focus position can be moved at high speed.

In this embodiment, a light source 23 such as a semiconductor laser is provided fixedly to the housing 6 so that emitted light is guided into the optical fiber 24. The emission end 25 of the optical fiber, i.e., a point source of light is fixed to the housing 6, so that converging light ray is obtained by the lens 33 fixed also to the housing 6. The two galvano-mirrors 71 and 72 are provided fixedly to the housing 6 and when the conversing light ray is reflected by the two galvano-mirrors 71 and 72, it is possible to change the direction of this light ray.

The galvano-mirror is a device for controlling an angle of a mirror reduced in size and weight utilizing electromagnetic force or the like, e.g., a device having such a structure that a mirror is fixed to a rotational axis of a servomotor. By employing the small-size mirror and a high-output motor, it is possible to change the direction of the light ray at high speed.

By adjusting the angle of the galvano-mirrors, the direction of the light ray is changed, so that the focus position can be changed.

In this embodiment, the galvano-mirrors are used, so that compared with Embodiment 6, it is possible to effect higher speed scanning of the focus position. Accordingly, it is possible to constitute an atomic force microscope with shorter measuring time.

In this embodiment, the galvano-mirror including the mirror constituted by the rotation-type servomotor is used but may also be constituted by using a torsion lever prepared by processing a silicon wafer.

Further, in this embodiment, the mirrors are disposed between the lens 33 and the polarization beam splitter 34 but may also be disposed at any position so long as they are located in the optical path. For example, a similar function of changing the focus position is achieved by disposing the mirrors between the prism 36 and the probe assembly.

As described above, according to the present invention, by providing the focus position movement means for controlling the focus position of the optical system depending on the probe position, it is possible to effect high-accuracy measurement in which the focus position of the optical system is caused to follow the probe. Further, compared with the case of integrally moving the light source and the lens with the tube scanner, the end of the probe scanner can be reduced in size. Further, by adjusting the focus position of the optical system in the optical axis direction depending on the probe position, measurement accuracy can be further improved. In addition, the auto focus apparatus can meet measure of a member to be measured having an uneven shape with a relatively large unevenness (depth or height), of projections and recesses of the uneven shape, of several tens of microns or more.

In this embodiment, the displacement of the probe in Z direction is detected by the optical detection means but the present invention is not limited thereto. It is also possible to measure the displacement by dividing the incident light from the light source into two light rays, including one thereof caused to be reflected at the reflection surface of the probe and the other light ray caused to be reflected at a reference surface, and by causing the two light rays to interfere with each other.

While the invention has been described with reference to the structures disclosed herein, it is not confined to the details set forth and this application is intended to cover such modifications or changes as may come within the purpose of the improvements or the scope of the following claims.

This application claims priority from Japanese Patent Application No. 038779/2006 filed Feb. 16, 2006, which is hereby incorporated by reference.

What is claimed is:

1. An atomic force microscope for measuring a surface shape of a member to be measured, comprising:
   a light source for emitting measuring light;
   a probe having a reflection surface;
   an optical system for focusing the measuring light from said light source on the reflection surface of said probe;
   a housing for holding said optical system;
   a probe scanner, mounted to said housing, for holding said probe and moving said probe in X direction, Y direction, or Z direction relative to said housing;

light detection means for detecting the measuring light reflected by the reflection surface;

processing means for processing displacement of said probe in Z direction on the basis of an output of said light detection means;

focus position movement means for moving a focus position of said optical system by shifting an optical path of the measuring light before the measuring light enters said optical system; and control means for controlling drive of said probe scanner and said focus position movement means, wherein said control means drives said focus position movement means in synchronism with drive of said probe scanner so that a focus position of the measuring light focused by said optical system is on the reflection surface of said probe.

2. A microscope according to claim 1, wherein said control means stores data of each of positions of said probe in X direction or Y direction driven by said probe scanner and data of positions, of said focus position movement means, each at which a focus position of the measuring light focused by said optical system is on the reflection surface of said probe at each of the positions of said probe, as position conversion data, and wherein on the basis of the position conversion data, said control means synchronously drives said probe scanner and said focus position movement means.

3. A microscope according to claim 2, wherein said position conversion data is prepared for each of the positions of said probe on the basis of an output map of said light detection means obtained by moving the focus position by said focus position movement means.

4. A microscope according to claim 2, wherein said position conversion data is prepared for each of the positions of said probe on the basis of an output map of said light detection means obtained by moving said probe by said probe scanner.

5. A microscope according to claim 1, wherein said focus position movement means moves light source in at least XY directions in a state in which said optical system is fixed.

6. A microscope according to claim 1, wherein said focus position movement means comprises said light source and at least one lens constituting said optical system, said wherein said light source and said lens are integrally moved in XY directions with respect to said housing.

7. A microscope according to claim 1, wherein said focus position movement means is a galvano mirror provided to said optical system.

8. A microscope according to claim 1, wherein said microscope further comprises a half mirror provided at an optical path of light reflected by the reflection surface of said probe and another optical system for guiding light branched by said half mirror into an auto focus apparatus.

9. An atomic force microscope for measuring a surface shape of a member to be measured, comprising:

a light source for emitting measuring light;

a probe assembly comprising a plurality of probes each having a reflection surface;

an optical system for focusing the measuring light from said light source on the reflection surface of one of the plurality of probes;

a housing for holding said optical system;

a probe scanner, mounted to said housing, for holding the plurality of probes and moving the plurality of probes in X direction, Y direction, or Z direction relative to said housing;

light detection means for detecting the measuring light reflected by the reflection surface;

processing means for processing displacement of said probe in Z direction on the basis of an output of said light detection means;

focus position movement means for moving a focus position of said optical system by shifting an optical path of the measuring light before the measuring light enters said optical system; and control means for controlling drive of said probe scanner and said focus position movement means, wherein said control means drives said focus position movement means in synchronism with drive of said probe scanner so that a focus position of the measuring light focused by said optical system is on the reflection surface of each of the plurality of probes by moving said focus position movement means between the plurality of probes.

10. A microscope according to claim 9, wherein said control means comprises a storing portion for storing a plurality of position conversion data for convening said of positions of the plurality of probes in X direction or Y direction into an associated focus position, a timing apparatus for generating timing signals corresponding to the plurality of probes, respectively, and selection means for selecting one of the plurality of position conversion data on the basis of an associated timing signal, and wherein said control means controls an amount of movement of the focus position by said focus position movement means by using the selected position conversion data.

* * * * *